US012036158B2

(12) United States Patent
Ang et al.

(10) Patent No.: US 12,036,158 B2
(45) Date of Patent: Jul. 16, 2024

(54) MOBILITY AID

(71) Applicants: NANYANG TECHNOLOGICAL UNIVERSITY, Singapore (SG); TAN TOCK SENG HOSPITAL PTE LTD, Singapore (SG)

(72) Inventors: Wei Tech Ang, Singapore (SG); Lei Li, Singapore (SG); Ming Jeat Foo, Singapore (SG); Carlo Tiseo, Singapore (SG); Seng Kwee Wee, Singapore (SG)

(73) Assignees: NANYANG TECHNOLOGICAL UNIVERSITY, Singapore (SG); TAN TOCK SENG HOSPITAL PTE LTD, Singapore (SG)

( * ) Notice: Subject to any disclaimer, the term of this patent is extended or adjusted under 35 U.S.C. 154(b) by 327 days.

(21) Appl. No.: 17/426,352

(22) PCT Filed: Jan. 29, 2020

(86) PCT No.: PCT/SG2020/050041
§ 371 (c)(1),
(2) Date: Jul. 28, 2021

(87) PCT Pub. No.: WO2020/159442
PCT Pub. Date: Aug. 6, 2020

(65) Prior Publication Data

US 2022/0096295 A1 Mar. 31, 2022

(30) Foreign Application Priority Data

Jan. 29, 2019 (SG) ........................... 10201900839V

(51) Int. Cl.
*A61G 5/14* (2006.01)
*A61G 5/10* (2006.01)
(Continued)

(52) U.S. Cl.
CPC ............. *A61G 5/14* (2013.01); *A61G 5/1056* (2013.01); *A61H 3/008* (2013.01); *A61H 3/04* (2013.01);
(Continued)

(58) Field of Classification Search
CPC ........... A61G 5/14; A61G 5/1056; A61H 3/04
See application file for complete search history.

(56) References Cited

U.S. PATENT DOCUMENTS 5,346,280 A 9/1994 Deumite
5,366,036 A * 11/1994 Perry ..................... A61G 5/006
180/907

(Continued)

FOREIGN PATENT DOCUMENTS

CN 107296693 A 10/2017
CN 109124907 A 1/2019

(Continued)

OTHER PUBLICATIONS

Supplementary Partial European Search Report for EP Application No. 20749400.6 dated Sep. 16, 2022 (16 pages).

(Continued)

*Primary Examiner* — Erez Gurari
(74) *Attorney, Agent, or Firm* — Alston & Bird LLP

(57) ABSTRACT

A mobility aid is provided. The mobility aid includes a mobile base movable along a mobile-base-movement plane, the mobile base having a plurality of wheels. The mobility aid also includes a seat pivotably coupled to the mobile base in a manner so as to be pivotable between a sitting disposition, in which the seat is oriented parallel to the mobile-base-movement plane, and a standing disposition, in which the seat is oriented perpendicular to the mobile-base-movement plane and a sitting surface of the seat is facing forward with respect to a forward-movement direction of the mobile
(Continued)

base. The mobility aid also includes a balance-assist unit having a balance-assist-linkage mechanism coupled to the seat, and a body-support-module coupled to the balance-assist-linkage mechanism. Components of the balance-assist-linkage mechanism are jointed in a manner movable to allow movements of the body-support-module relative to the seat along a module-movement-plane parallel to the mobile-base-movement plane when the seat is in the standing disposition.

20 Claims, 14 Drawing Sheets

(51) Int. Cl.
*A61H 3/00* (2006.01)
*A61H 3/04* (2006.01)

(52) U.S. Cl.
CPC .. *A61H 2003/007* (2013.01); *A61H 2003/046* (2013.01); *A61H 2201/1671* (2013.01); *A61H 2201/1676* (2013.01); *A61H 2201/5064* (2013.01); *A61H 2201/5084* (2013.01); *A61H 2203/0406* (2013.01); *A61H 2203/0431* (2013.01); *A61H 2203/0487* (2013.01)

(56) References Cited

U.S. PATENT DOCUMENTS

| | | | | |
|---|---|---|---|---|
| 6,231,067 | B1 * | 5/2001 | Johnson | A61G 5/1091 180/907 |
| 7,281,447 | B2 * | 10/2007 | Gosselin | B25J 9/04 74/89.22 |
| 7,544,172 | B2 | 6/2009 | Santos-Munne et al. | |
| 7,803,125 | B2 | 9/2010 | Santos-Munne et al. | |
| 8,403,352 | B2 | 3/2013 | Hunziker | |
| 9,492,339 | B2 | 11/2016 | Leib | |
| 10,507,146 | B1 * | 12/2019 | Alhajery | A61G 5/14 |
| 10,857,058 | B1 * | 12/2020 | Casibang | A61H 3/04 |
| 2003/0227161 | A1 * | 12/2003 | Redman | A61G 5/045 280/755 |
| 2004/0173998 | A1 * | 9/2004 | Meyer | A61G 5/14 280/657 |
| 2004/0212177 | A1 * | 10/2004 | Kuiken | A61G 5/14 280/647 |
| 2009/0242007 | A1 * | 10/2009 | Heyer | A61H 3/0277 135/71 |
| 2010/0207354 | A1 | 8/2010 | Hunziker | |
| 2017/0128314 | A1 * | 5/2017 | Dropsho | A61H 3/0288 |
| 2018/0014988 | A1 | 1/2018 | Diaz-Flores et al. | |
| 2018/0325767 | A1 | 11/2018 | Andersen | |
| 2019/0209418 | A1 * | 7/2019 | VanAusdall | B62B 5/0438 |
| 2019/0240106 | A1 * | 8/2019 | Kapec | A61H 3/04 |
| 2020/0146924 | A1 * | 5/2020 | Younger | A61H 3/02 |
| 2021/0361517 | A1 * | 11/2021 | Reuveni | A61G 5/0891 |
| 2021/0401643 | A1 * | 12/2021 | Moore | A61G 5/12 |
| 2021/0401644 | A1 * | 12/2021 | Villarreal Suarez | A61G 5/041 |
| 2022/0096295 | A1 * | 3/2022 | Ang | A61G 5/14 |

FOREIGN PATENT DOCUMENTS

| | | |
|---|---|---|
| DE | 202009013889 U1 | 4/2010 |
| FR | 3055798 A1 | 3/2018 |
| JP | 2007-202924 A | 8/2007 |
| JP | 2014-128724 A | 7/2014 |
| KR | 101453482 B1 | 10/2014 |
| WO | WO 1988/001578 | 3/1988 |
| WO | WO 2012118263 | 9/2012 |

OTHER PUBLICATIONS

Nyberg L, Gustafson Y. Patient falls in stroke rehabilitation. A challenge to rehabilitation strategies. Stroke 1995;26:838-42.

Lee RG. Health and safety in hospitals. Med Sci Law. 1979;19:89-103.

Forster A, Young J. Incidence and consequences of falls due to stroke: a systematic inquiry. BMJ 1995;311:83-6.

Mayo NE, Korner-Bitensky N, Becker R, Georges P. Predicting falls among patients in a rehabilitation hospital. Am J Phys Med Rehabil. 1989;68:139-146.

Bohannon RW, Leary KM. Standing balance and function over the course of acute rehabilitation. Arch Phys Med Rehabil 1995;76: 994-6.

Fong KN, Chan CC, Au DK. Relationship of motor and cognitive abilities to functional performance in stroke rehabilitation. Brain Inj 2001;15:443-53.

Desrosiers J, Noreau L, Rochette A, Bravo G, Boutin C. Predictors of handicap situations following post-stroke rehabilitation. Disabil Rehabil 2002;24:774-85.

Lin JH, Hsieh CL, Hsiao SF, Huang MH. Predicting long-term care institution utilization among post-rehabilitation stroke patients in Taiwan: a medical centre-based study. Disabil Rehabil 2001;23: 722-30.

Pollock A, Baer G, Pomeroy V, Langhorne P. Physiotherapy treatment approaches for the recovery of postural control and lower limb function following stroke. Cochrane Database Syst Rev 2003. CD001920.

Johansson BB, Haker E, von Arbin M, Britton M, Langstrom G, Terent A, et al. Acupuncture and transcutaneous nerve stimulation in stroke rehabilitation: a randomized, controlled trial. Stroke 2001;32: 707-13.

Glanz M, Klawansky S, Stason W, Berkey C, Chalmers TC. Functional electrostimulation in poststroke rehabilitation: a meta-analysis of the randomized controlled trials. Arch Phys Med Rehabil 1996;77: 549-53.

Glanz M, Klawansky S, Chalmers T. Biofeedback therapy in stroke rehabilitation: a review. J R Soc Med 1997;90:33-9.

Schleenbaker RE, Mainous AG. Electromyographic biofeedback for neuromuscular reeducation in the hemiplegic stroke patient: a metaanalysis. Arch Phys Med Rehabil 1993;74:1301-4.

Geiger RA, Allen JB, O'Keefe J, Hicks RR. Balance and mobility following stroke: effects of physical therapy interventions with and without biofeedback/forceplate training. Phys Ther 2001;81:995-1005.

Pollock AS, Durward BR, Rowe PJ, Paul JP. What is balance? Clin Rehabil 2000 14: 402.

Moseley AM, Stark A, Cameron ID, Pollock A. Treadmill training and body weight support for walking after stroke. Cochrane Database Syst Rev 2003. CD002840.

Jezernik, S., Colombo, G., Keller, T., Frueh, H. and Morari, M. (2003), Robotic Orthosis Lokomat: A Rehabilitation and Research Tool. Neuromodulation: Technology at the Neural Interface, 6: 108-115.

J. Patton, D. a Brown, M. Peshkin, J. J. Santos-Munné, A. Makhlin, E. Lewis, E. J. Colgate, and D. Schwandt, "KineAssist: design and development of a robotic overground gait and balance therapy device.," Top. Stroke Rehabil., vol. 15, No. 2, pp. 131-139, 2008.

K. R. Mun, et al. "Development and evaluation of a novel overground robotic walker for pelvic motion support." Rehabilitation Robotics (ICORR), 2015 IEEE International Conference on. IEEE, 2015.

Hocoma Andago, webpage link: https://www.hocoma.com/us/solutions/andago/.

Magnetic particle brake, webpage link: http://www.warnerelectric.com/products/torque-control-products/magnetic-particle.

WHO report, webpage link: http://www.who.int/disabilities/publications/technology/wheelchairguidelines/en/.

Aging society, webpage link: https://www.adb.org/features/asia-s-growing-elderly-population-adb-s-take.

Falling chance of elderly, webpage link: https://www.seniorelderlycare.com/tips-for-senior/fall-injury/.

Tiseo, C. et al., Mobile Robotic Assistive Balance Trainer—An intelligent compliant and adaptive robotic balance assistant for daily living. 2014 36th Annual International Conference of the IEEE Engineering in Medicine and Biology Society (EMBC). IEEE

(56) References Cited

OTHER PUBLICATIONS

Engineering in Medicine and Biology Society Conference Proceedings, Institute of Electrical and Electronics Engineers (IEEE), Aug. 30, 2014, pp. 5300-5303.

Extended European Search Report for EP Application No. 20749400.6 dated Jan. 2, 2023 (16 pages).

1st China Office Action for China Patent Application No. 202080026687X issued Jan. 26, 2024, with English translation (23 pages).

* cited by examiner

MOBILITY AID

This application is a national phase entry of PCT/SG2020/050041, filed on Jan. 29, 2020, which claims the benefit of priority of Singapore Patent Application No. 10201900839V, filed on Jan. 29, 2019, the contents of which being hereby incorporated by reference in its entirety for all purposes.

TECHNICAL FIELD

Various embodiments generally relate to a mobility aid. In particular, various embodiments generally relate to a mobility aid for home-based rehabilitation and daily activity assistance.

BACKGROUND

The degeneration of the human balance control system happens in the natural ageing process and in many pathologies such as neurological insults (e.g. head injury, stroke, spinal cord injury, cerebellar disease, Parkinson's Disease, peripheral neuropathies, cerebral palsy, etc.), musculoskeletal problems (e.g. chronic ankle sprains, chronic degenerative low back pain, scoliosis, amputation, etc.) and vestibular deficits (e.g. benign paroxysmal positional vertigo). A consequence of weakened balance control is fall. Accordingly, patient falls have been an issue of concern in geriatric care and rehabilitation. The occurrence of falls among elderly patients can be in both healthcare facilities and at home. The degenerated balance control system also heightens the risk of falls among stroke patients and falls have been a factor in patient injuries during the period of undergoing rehabilitation therapy in both inpatient and outpatient cases. In the contemporary stroke care paradigm, patients' mobility and independence are encouraged and, ironically, the risks of falls might be unavoidable. Balance control generally has a significant impact on activities of daily living (ADL) independence and gait, because it is a fundamental motor skill and prerequisite to the maintenance of a myriad of postures and mobile activities. The ability to control balance or posture may be a predictor of independent living and may be one of the motor skill impairment which prompts self-perceived disability among patients discharged from rehabilitation.

In general, balance rehabilitation can be categorized into two approaches. The first approach is Postural balance training which focuses on static tasks, such as sit-to-stand, reactive balance to external perturbation, exercises to shift Centre of Mass (e.g. Nintendo Wii Fit Balance Board games), etc. The second approach is Gait training which may involve both static and dynamic postural control of the body, body weight supported treadmill training and/or robot-assisted gait training (e.g. Lokomat, Hocoma AG, Switzerland).

Among these approaches, the gait rehabilitation approach is usually preferred because it has been more effective as people trained on gait also improve significantly also in postural balance but not vice versa. This may be connected to the intrinsic multitask nature of the gait, which requires balancing to perform.

The idea of an over-ground gait or balance trainer has been explored by the rehabilitation robotics community in the past decade, most notably is the 'KineAssist' developed at Northwestern University, USA, commercialized by Kinea Design LLC and being acquired by HDT Global in 2011. After the acquisition, the core KineAssist technology has been transformed from an over-ground trainer to a treadmill-based system. A similar technology with a smaller footprint, the 'Robotic Walker for Gait Rehabilitation' has been reported by Mun of National University of Singapore (NUS) focusing on Parkinson's Disease patients. As reported in the published literature, the users of both of these systems are experiencing an altercation in gait strategies, especially in the stages of transiting between standing and walking (i.e. starting and stopping), because of the inertial of the mobile base being felt through the robot arm. A more recent product 'Andago' was launched by Hocoma AG, Switzerland in 2015, based on a suspended harness system. However, none of these rehabilitation technologies appear to be suitable for a daily living environment. Accordingly, these current technologies appear to be constrained for institution based, rather than home or community based, intended use scenarios. Further, the user's natural gait is altered by the inertial of the mobile base of these technologies transmitted through the human-machine interface, especially in the start and stop phase. In addition, there is no specific attention on the timing of balance intervention, the assistance is rendered either at the point of fall (KineAssist and Robotic Walker for Gait Rehabilitation) or is always there (Andago).

Accordingly, there is a need for a more effective mobile aid suitable for home-based rehabilitation and daily activity assistance which addresses the above issues.

SUMMARY

According to various embodiments, there is provided a mobility aid. The mobility aid may include a mobile base movable along a mobile-base-movement plane, the mobile base having a plurality of wheels. The mobility aid may include a seat pivotably coupled to the mobile base in a manner so as to be pivotable between a sitting disposition, in which the seat is oriented parallel to the mobile-base-movement plane, and a standing disposition, in which the seat is oriented perpendicular to the mobile-base-movement plane and a main sitting surface of the seat is facing forward with respect to a forward-movement direction of the mobile base. The mobility aid may include a balance-assist unit having a balance-assist-linkage mechanism coupled to the seat, and a body-support-module coupled to the balance-assist-linkage mechanism. According to various embodiments, components of the balance-assist-linkage mechanism may be jointed in a manner movable to allow movements of the body-support-module relative to the seat along a module-movement-plane parallel to the mobile-base-movement plane when the seat is in the vertical disposition.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Figure 1B:
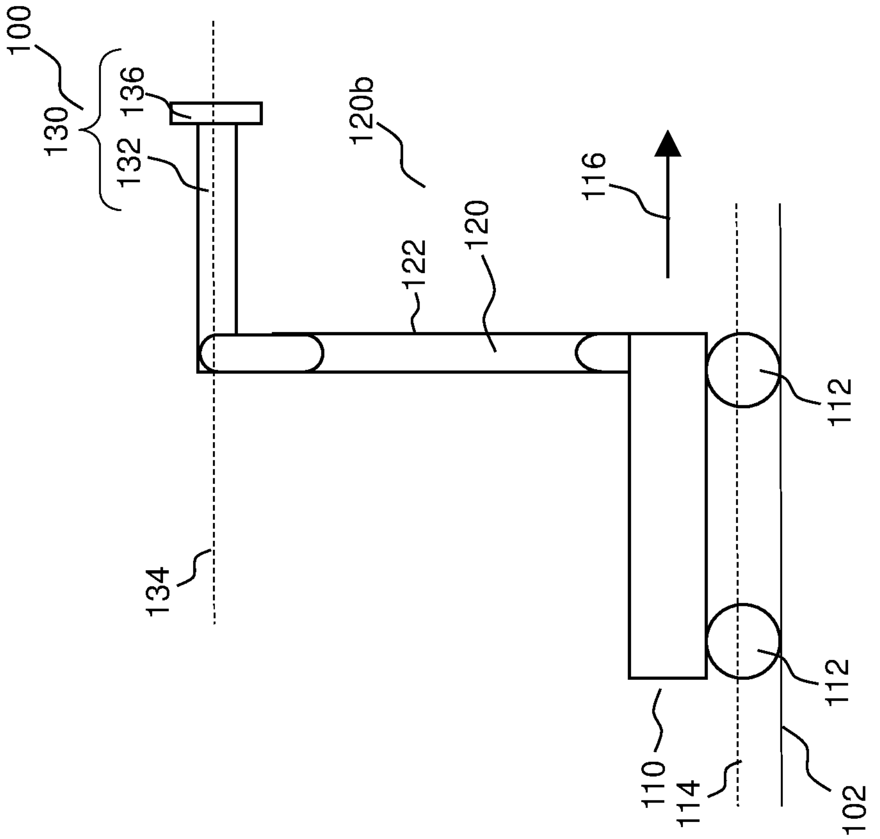
FIG. 1A and FIG. 1B show a schematic diagrams of a mobility device according to various embodiments.

Embodiments described below in the context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

There are currently no commercially available technological solutions for fall prevention in the home environment. Current technological solutions for balance assistance mentioned in the background section are designed as a rehabilitation system, have large footprint and low maneuverability, making them undesirable to be used as an assistive device for home environment.

Various embodiments seek to address this technology gaps. Various embodiments generally relate to a mobility aid. In particular, various embodiments generally relate to a mobility aid for home-based rehabilitation and daily activity assistance. Various embodiments in the form of the mobility aid may serve as a mobile robotic balance assistant or a mobile balance assistant. According to various embodiments, the mobility aid may be a device configured to improve the mobility and/or balance of people, assist walking or balancing, or be used as a gait or balance trainer. According to various embodiments, the mobility aid may include a follow-me robotic wheelchair (or a mobile base) and a balance assistive robotic arm (or a balance-assist unit) which provides body weight support and balance support to the user. According to various embodiments, using a powered wheelchair as a base platform (or mobile base) may allow the user to perform a wide variety of activities of daily living (ADL) at home with only one piece of mobility aid. With the wheelchair (or the mobile base) following closely behind the user, the balance assistive robotic arm (or the balance-assist unit) with intelligent control algorithm may only provide support and assistance to the user when needed, mimicking the helping hands of a parent when a toddler learns to walk. It may enable a new rehabilitation therapy to administer standing and mobile balance control training.

Various embodiments seek to allow home-based rehabilitation and introduce new rehabilitation method which is more effective than traditional therapies because more practices in balancing tasks during actual ADL may promote true recovery in motor skills dependent on balance ability.

According to various embodiments, the mobility aid may be a robotic wheelchair which may transform between sitting and standing position and which may use robotic arm (or the balance-assist unit) to connect to human body (hip, trunk, pelvis) to provide balance support. According to various embodiments, the mobility aid may allow the users to go along with their activities of daily living in the home environment and may has four modes of operation. The first mode may be a 'sitting mobility mode'. In the 'sitting mobility mode', the mobility aid may perform the basic functions of a powered wheelchair. Accordingly, the mobility aid may be used to move the user around via the mobile base while the user is sitting on the mobility aid. The second mode may be a 'transfer mode'. In the 'transfer mode', the sit to stand mechanism of the seat may provide assistance to the user during the transition from sitting to standing. Accordingly, the mobility aid may be used to assist the user to stand up from a sitting posture. The third mode may be a 'following mode'. In the 'following mode', the mobility aid may be capable of following the user's movement by tracking the user movements. Accordingly, the mobility aid may track and follow the user when the user is walking normally. At the same time, the balance assistive robotic arm (or the balance-assist unit) may compliantly follows the user and does not hinder the natural movement of the user when the user is walking normally. The fourth mode may be a 'balance mode'. In the 'balance mode', actuation may be provided to the user by the balance assistive robotic arm (or the balance-assist unit) of the mobility aid when a fall detection algorithm detects fall, e.g. from a balance assistive mechanism or the balance-assist unit.

According to various embodiments, the mobility aid may include the mobile base. According to various embodiments, the mobile base may be in the form of a wheel chair or a powered wheel chair or a mobility scooter or other similar wheeled devices. According to various embodiments, the mobile base may provide stability (as compared to KineaAssist, NUS Robotic Walker and Andago). Accordingly, the target operating environment of the mobility aid of the various embodiments may be moved beyond clinical facility to go into community and home. In contrast, the intended use scenarios for existing conventional rehabilitation technologies are all institution based, rather than home or community based.

According to various embodiments, the mobility aid may include the intrinsic transparent balance assistive robotic arm (or the balance-assist unit). The balance assistive robotic arm (or the balance-assist unit) may be the interface between the mobile base and the user. The balance assistive robotic arm (or the balance-assist unit) may be as transparent as possible to the user when the user does not require any assistance. According to various embodiments, the contact point of balance intervention of the balance assistive robotic arm (or the balance-assist unit) may be at the pelvis, because it is near the CoM (Center of Mass) of human and may allow the assistive force being delivered more effectively. According to various embodiments, the balance assistive robotic arm (or the balance-assist unit) is intrinsic transparent which does not require expensive force/torque sensors, expensive high-performance motion controllers and complicated control algorithms. The intrinsic transparent property of the balance assistive robotic arm (or the balance-assist unit) may decouple the dynamics of the mobile base from the user so that the movements of the mobile base may not affect the user. Meanwhile, the balance assistive robotic arm (or the balance-assist unit) has a larger workspace compared to existing rehabilitation technologies. The large works space of the balance assistive robotic arm (or the balance-assist unit) may ensure adequate task space to perform ADLs without requiring the movements of the mobile base. Lastly, the balance assistive robotic arm (or the balance-assist unit) may have six degree-of-freedom to allow all the natural movements of pelvis being performed by the user.

According to various embodiments, the mobility aid may include a variable stiffness compliant mechanism (or a variable braking system). In the recent years, variable stiffness (or compliant) actuators or mechanisms have been widely adopted in robotic systems with direct contact with the human body. The controllable compliant characteristic of this class of actuator or mechanism allows the impact on human body to be 'softened' to avoid injury as some of the actuated force or torque is absorbed by the spring and damper in such actuator or mechanism. However, these systems require complex control algorithm and expensive high-power motors to achieve better controllability and large assistance force. According to various embodiments, magnetic powder brake may be used to adjust stiffness. According to various embodiments, the magnetic powder brake may have a linear relationship between the input voltage and the brake force. According to various embodiments, the balance assistive robotic arm (or the balance-assist unit) may be stiffened almost instantaneously to catch a fall when required and may become compliant or 'soft' when free space is needed to allow the user to move around. According to various embodiments, the magnetic powder brake may not be directly coupled to the joints of the balance assistive robotic arm (or the balance-assist unit). According to various embodiments, a cable driven mechanism may be utilized so as to put the magnetic powder brake to the mobile base. The cable driven mechanism may help to keep the balance assistive robotic arm (or the balance-assist unit) to minimum weight which improve the transparency of the system. In addition, the cable driven mechanism may allow to placement of the magnetic powder brake to adjust the CoM of the mobile base.

According to various embodiments, there is provided a mobility aid. The mobility aid may include a mobile base movable along a mobile-base-movement plane, the mobile base having a plurality of wheels. The mobility aid may include a seat pivotably coupled to the mobile base in a manner so as to be pivotable between a sitting disposition, in which the seat is oriented parallel to the mobile-base-movement plane, and a standing disposition, in which the seat is oriented perpendicular to the mobile-base-movement plane and a main sitting surface of the seat is facing forward with respect to a forward-movement direction of the mobile base. The mobility aid may include a balance-assist unit having a balance-assist-linkage mechanism coupled to the seat, and a body-support-module coupled to the balance-assist-linkage mechanism. According to various embodiments, components of the balance-assist-linkage mechanism may be jointed in a manner movable to allow movements of the body-support-module relative to the seat along a module-movement-plane parallel to the mobile-base-movement plane when the seat is in the vertical disposition.

According to various embodiments, the mobility device may include a parallelogram linkage mechanism connecting the mobile base, the seat and the balance-assist unit, the parallelogram linkage mechanism having a pair of equal parallel links being parallel to the seat. According to various embodiments, the seat may be attached to one of the pair of equal parallel links. According to various embodiments, first and second pin joints of the parallelogram linkage mechanism, which are respectively at first longitudinal ends of the pair of equal parallel links, may couple the seat to the mobile base and third and fourth pin joints of the parallelogram linkage mechanism, which are respectively at second longitudinal ends of the pair of equal parallel links, may couple the seat to the balance-assist-unit in a manner such that an orientation of the balance-assist-linkage mechanism of the balance-assist-unit with respect to the mobile base may be unchanged when the seat is pivoted about the first and second pin joints simultaneously to move the seat between the sitting disposition and the standing disposition with respect to the mobile base.

According to various embodiments, the mobility aid may include a seat-actuator disposed between the seat and the mobile base so as to actuate the seat between the sitting disposition and the standing disposition.

According to various embodiments, the balance-assist-linkage mechanism may be configured to provide the body-support-module with a three degree-of-freedom relative to the seat along the module-movement-plane, the three degree-of-freedom may include forward and backward movements which are parallel to the forward-movement direction of the mobile base, lateral movements which are perpendicular to the forward and backward movements, and yaw movements about a support-module-rotational axis which is perpendicular to the module-movement-plane.

According to various embodiments, the balance-assist-linkage mechanism may include a pair of arm assemblies. Each arm assembly may include a first link member and a second link member. According to various embodiments, the first link member may be rotatable about a first revolute joint having a first rotational axis perpendicular to the module-movement-plane, the first revolute joint connecting the first link member to the seat. According to various embodiments, the second link member may be in sliding engagement with the first link member via a prismatic joint having a sliding axis along or parallel to the module-movement-plane. According to various embodiments, the body-support-module may be connected to the second link member via a second revolute joint having a second rotational axis perpendicular to the module-movement-plane.

According to various embodiments, the balance-assist-linkage mechanism may include a pair of arm assemblies. Each arm assembly may include a first link member and a second link member. According to various embodiments, the first link member may be rotatable about a first revolute joint having a first rotational axis perpendicular to the module-movement-plane, the first revolute joint connecting the first link member to the seat. According to various embodiments, the second link member may be connected and rotatable relative to the first link member via a second revolute joint having a second rotational axis perpendicular to the module-movement-plane. According to various embodiments, the body-support-module may be connected to the second link member via a third revolute joint having a third rotational axis perpendicular to the module-movement-plane.

According to various embodiments, the body-support-module may include a connection structure which couples the body-support-module to the balance-assist-linkage mechanism; a body-support-member; and a support-member-movement mechanism which couples the body-support-member to the connection structure. According to various embodiments, the support-member-movement mechanism may be configured to provide the body-support-member with three degree-of-freedom relative to the connection structure, the three degree-of-movement including upward and downward movements perpendicular to the module-movement-plane, roll movements about a roll axis extending perpendicularly from a body contact surface of the body-support-member, and pitch movements about a pitch axis perpendicular to both the roll axis and upward and downward movements.

According to various embodiments, the mobility aid may include a variable braking system coupled to the balance-assist-linkage mechanism of the balance-assist unit to vary a stiffness of the balance-assist-linkage mechanism.

According to various embodiments, the variable braking system may include a brake mechanism located at the mobile base and a cable connecting the brake mechanism to one of the joints of the balance-assist-linkage mechanism to provide a resistive force from the brake mechanism to said joint for stiffness control of said joint.

According to various embodiments, the variable braking system may include a cable routing assembly having a set of pulleys to guide the cable from the one of the joints of the balance-assist-linkage mechanism to the brake mechanism.

According to various embodiments, the cable routing assembly may include a brake-pulley which is directly connected to the brake mechanism and to which an end of the cable is attached, According to various embodiments, the variable braking system may include four brake mechanisms located at the mobile base and four cables connecting the four brake mechanisms respectively to four joints of the balance-assist-linkage mechanism.

According to various embodiments, the brake mechanism may include a magnetic powder brake. According to various embodiments, the cable may include a Bowden cable.

According to various embodiments, the mobility aid may include a shank support mechanism at a front portion of the mobile base with respect to the forward-movement direction of the mobile base. The shank support mechanism may include a pair of shank support plates, and a movement mechanism configured to move the pair of shank support plates between an open position and a close position. According to various embodiments, in the open position, the pair of shank support plates may be moved apart from each other such that a space in front of the front portion of the mobile base may be unobstructed by the pair of shank support plates. According to various embodiments, in the closed position, the pair of shank support plates may be moved towards each other such that the pair of shank support plates may be positioned in front of the front portion of the mobile base.

According to various embodiments, the body-support-module may include a securing component for connecting a user to the balance-assist unit.

According to various embodiments, the securing component may include a quick attachment and release buckle.

According to various embodiments, the balance-assist unit may further include a sensor arrangement configured to detect movements of the balance-assist unit.

According to various embodiments, the sensor arrangement may include at least one position sensor attached to the balance-assist-linkage mechanism.

According to various embodiments, the sensor arrangement may include at least one inertial measurement unit or accelerometer attached to the body-support-module.

According to various embodiments, the mobility aid may include a processor configured to control the mobile base for automatic following based on detection signals from the sensor arrangement when the seat is in the vertical disposition, and further configured to control a degree of stiffness of the balance-assist-linkage mechanism of the balance-assist unit based on detection signals from the sensor arrangement when the seat is in the vertical disposition.

Figure 1A:
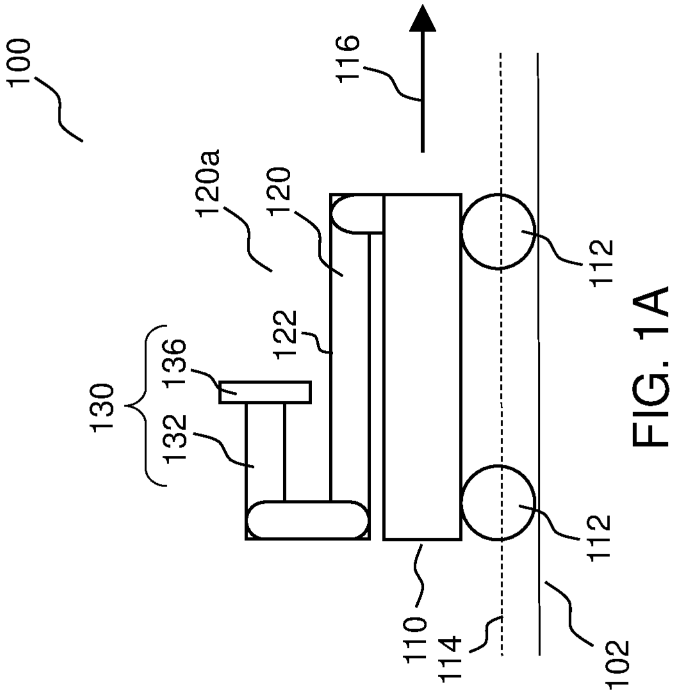

FIG. 1A and FIG. 1B show a schematic diagrams of a mobility device 100 according to various embodiments. According to various embodiments, the mobility device 100 may include a mobile base 110. According to various embodiments, the mobile base 110 may be movable along a mobile-base-movement plane 114 which may be parallel to a ground 102 or may be horizontal. According to various embodiments, the mobile base 110 may include a plurality of wheels 112. According to various embodiments, the mobile base 110 may include two or three or four or five or six or more wheels 112. According to an example embodiment, the mobile base 110 may include four wheels 112 or two pairs of wheels 112. According to various embodiments, the mobile base 110 may include a wheel chair or a powered wheel chair or a mobility scooter or other similar wheeled devices. According to various embodiments, the mobile base 110 may be movable manually or under power. According to various embodiments, the mobile base 110 may include at least one motor (for example see 218 of FIG. 2A to FIG. 2C) to drive at least one of the plurality of wheels. According to various embodiments, the at least one motor may drive at least one of the plurality of wheels for moving the mobile base 110 based on a motor-control signal. According to various embodiments, the mobile base 110 may include at least one steering mechanism (not shown) to steer at least one of the plurality of wheels. According to various embodiments, the at least one steering mechanism may be steered manually or under actuation. According to various embodiments, the mobile base 110 may include at least one steering actuator (not shown) to actuate and steer the at least one steering mechanism. According to various embodiments, the at least one steering actuator may steer the mobile base 110 based on a steering-control signal.

According to various embodiments, the mobility aid 100 may include a seat 120. According to various embodiments, the seat 120 may be pivotably coupled to the mobile base 110 in a manner so as to be pivotable between a sitting disposition 120*a* and a standing disposition 120*b*. FIG. 1A shows the seat 120 in the sitting disposition 120*a* and FIG. 1B shows the seat 120 in the standing disposition 120*b*. According to various embodiments, the seat 120 may be pivotable under actuation via a seat actuator (for example, see 228 of FIG. 2A to FIG. 2C). According to various embodiments, the seat actuator may pivot the seat based on a seat-actuation-control signal.

According to various embodiments, in the sitting disposition 120*a*, the seat 120 may be oriented in a substantially horizontal manner with respect to the mobile-base-movement plane 114 such that a user's weight in the gravitational direction may rest directly on the seat (or the seat may bear the weight of the user in the gravitational direction) when the user is sitting on the seat in the sitting disposition 120*a*. Accordingly, the seat 120 may be oriented parallel to the mobile-base-movement plane 114. Hence, a main sitting surface 122 of the seat 120 may be substantially parallel to the mobile-base-movement plane 114 of the mobile base 110 when the seat 120 is in the sitting disposition 120*a*.

According to various embodiments, in the standing disposition 120*b*, the seat 120 may be oriented in a substantially vertical manner with respect to the mobile-base-movement plane 114 of the mobile base 110 such that the user may no longer be seated on the seat 120 and has to stand because the seat 120 may no longer be in an orientation capable of allowing the user to sit so as to support the user's weight in the gravitational direction. Accordingly, the seat 120 may be oriented substantially perpendicular to the mobile-base-movement plane 114. Hence, the main sitting surface 122 of the seat 120 may be substantially perpendicular to the mobile-base-movement plane 114 when the seat 120 is in the standing disposition 120*b*. According to various embodiments, in the standing disposition 120*b*, the main sitting surface 122 of the seat 120 may be facing forward with respect to a forward-movement direction 116 of the mobile base 110. Accordingly, the seat 120 may be pivoted relative to the mobile base 110 about a pivoting axis which is perpendicular to the forward-movement direction 116 of the mobile base 110 and parallel to the mobile-base-movement plane 114 of the mobile base 110. Hence, the seat 120 may be oriented upright with the main sitting surface 122 directed in the forward-movement direction 116 of the mobile base 110.

According to various embodiments, the mobility aid 100 may include a balance-assist unit 130. According to various embodiments, the balance-assist unit 130 may be configured to provide an interface between the mobility aid 100 and the user when the seat 120 of the mobility aid 100 is in the standing disposition 120*b*. According to various embodiments, the balance-assist unit 130 may be configured to follow the user's movement in an intrinsically transparent manner when the user does not require any assistance during standing or walking, whereby the balance-assist unit 130 may be compliant to the user's movement without being a hindrance or an obstruction. According to various embodiments, the balance-assist unit 130 may be configured to vary a stiffness of the balance-assist unit 130 so as to vary a degree of compliance to the user's movement depending on a degree of assistance required by the user. According to various embodiments, the degree of compliance of the balance-assist unit 130 may be based on a detection of an impending fall (e.g. direction, velocity, acceleration etc.) such that the balance-assist unit 130 may be stiffened accordingly to provide support and assistance to the user so as to prevent the user from falling.

According to various embodiments, the balance-assist unit 130 may include a balance-assist-linkage mechanism 132 coupled to the seat 120, and a body-support-module 136 coupled to the balance-assist-linkage mechanism 132. According to various embodiments, the body-support-module 136 may be the interface with the user. According to various embodiments, the body-support-module 136 may be configured to contact or connect to a part of the user's body such as, including but not limited to, a hip or a trunk or a pelvis. According to various embodiments, the balance-assist-linkage mechanism 132 may include an assembly of link members and joints to manage forces and movement so as allow the body-support-module 136 to follow the user's movement in a compliance manner such that the body-support-module 136 in contact or connected to the user's body may not be a hindrance or an obstruction when the user does not require any assistance. According to various embodiments, the balance-assist-linkage mechanism 132 may be further configured to vary a stiffness of its components, e.g. the joints, so as to vary a degree of compliance of the balance-assist-linkage mechanism 132 to the user's movement based on a detection of an impending fall (e.g. direction, velocity, acceleration etc.) for providing support and assistance to the user to prevent the user from falling. According to various embodiments, the balance-assist-linkage mechanism 132 may be stiffen based on a fall-detection signal.

According to various embodiments, components (e.g. link members and joints) of the balance-assist-linkage mechanism 132 may be jointed in a manner movable to allow movements of the body-support-module 136 relative to the seat 120 along a module-movement-plane 134 parallel to the mobile-base-movement plane 114 of the mobile base 110 when the seat is in the vertical disposition 120*b*. According to various embodiments, movements of the body-support-module 136 may be in response to the movement of the user in contact or connected to the body-support-module 136 when the user is standing or walking. According to various embodiments, the components of the balance-assist-linkage mechanism 132 may be jointed in any suitable configuration so as to provide planar movements to the body-support-module 136. According to various embodiments, the planar movements of the body-support-module 136 may lie in a module-movement-plane 134 which is parallel to the mobile-base-movement plane 114 of the mobile base 110. According to various embodiments, the components of the balance-assist-linkage mechanism 132 may be configured to provide the user with a reachable semi-circular planar workspace with respect to the mobility aid 100.

As shown in FIG. 1B, according to various embodiments, the balance-assist-linkage mechanism 132 may be extendable and retractable at least along an extension axis which is parallel to the forward-movement direction 116 of the mobile base 110 and which is parallel to or lies in the module-movement-plane 134 of the body-support-module 136 such that the body-support-module 136 may be moved forward to be ahead of the mobile base 110.

Figures 2A, 2B, 2C:
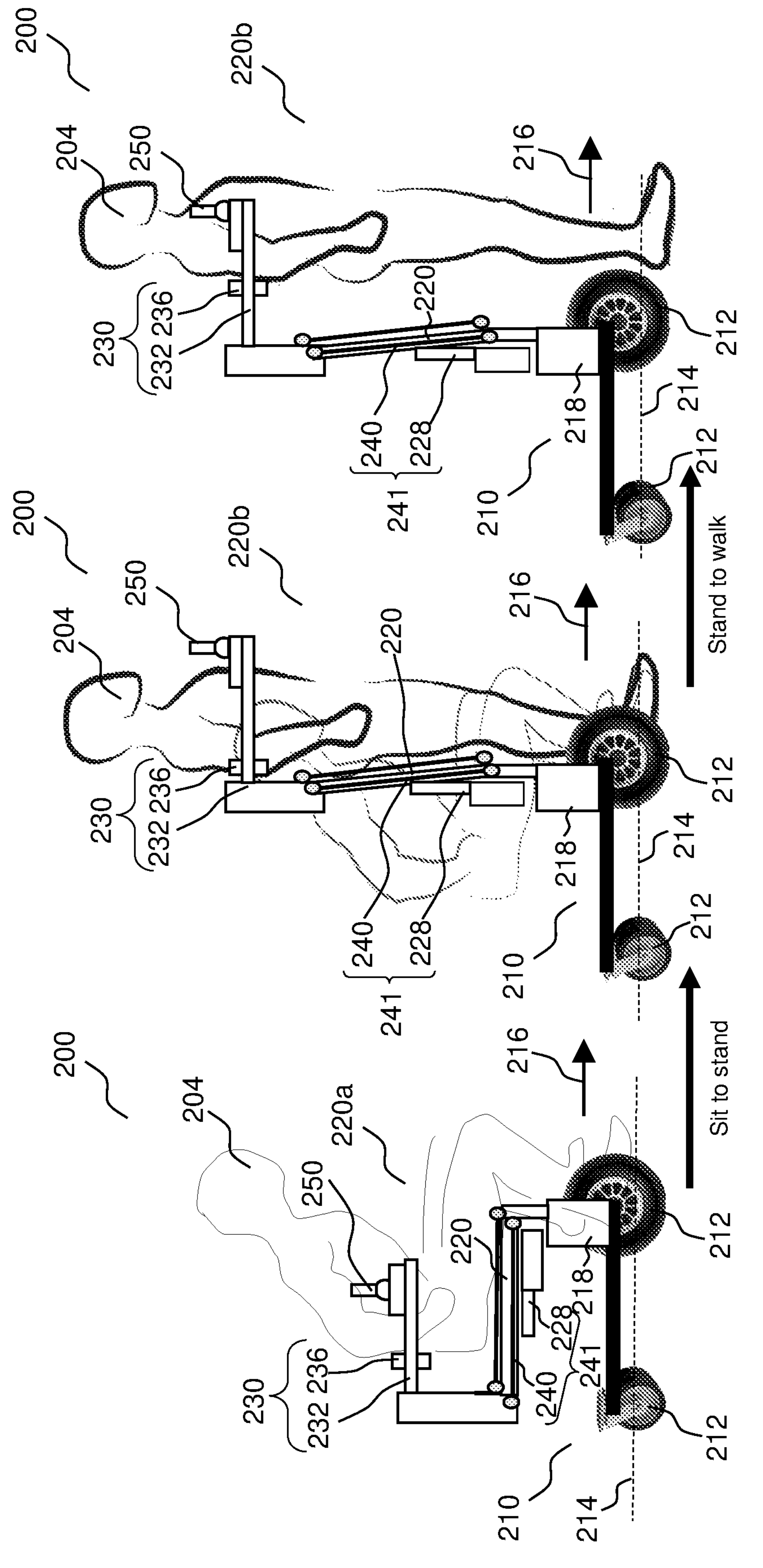
FIG. 2A to FIG. 2C show a sequence of motion of a mobility aid with the user illustrating various modes of the mobility aid according to various embodiments.

FIG. 2A to FIG. 2C show a sequence of motion of a mobility aid 200 with the user 204 illustrating various modes of the mobility aid 200 according to various embodiments. FIG. 2A shows the mobility aid 200 in a 'sitting mode'. FIG. 2B shows the mobility aid 200 in a 'transfer mode'. FIG. 2C shows the mobility aid 200 in a 'following mode'. According to various embodiments, the mobility aid 200 may, similar to the mobility aid 100 of FIG. 1A and FIG. 1B, include a mobile base 210 (e.g. a wheelchair as shown), a seat 220, and a balance-assist unit 230 (e.g. a balance assistive robotic arm). According to various embodiments, the mobile base 210 may, similar to the mobile base 110 of FIG. 1A and FIG. 1B, be movable along a mobile-base-movement plane 214 and may include a plurality of wheels 212. According to various embodiments, the seat 220 may, similar to the seat 120 of FIG. 1A and FIG. 1B, be pivotally coupled to the mobile base 210 in a manner so as to be pivotable between a sitting disposition 220*a* (as shown in FIG. 2A) and a standing disposition 220*b* (as shown in FIG. 2B). According to various embodiments, the balance-assist unit 230 may, similar to the balance-assist unit 130 of FIG. 1A and FIG. 1B, include a balance-assist-linkage mechanism 232 coupled to the seat 220 and a body-support-module coupled 236 to the balance-assist-linkage mechanism 232. Shown differently from the mobility aid 100 of FIG. 1A and FIG. 1B, the mobility aid 200 as shown in FIG. 2A to FIG. 2C may include an actuation system including at least one motor 218 connected to at least one wheel 212 of the plurality of wheels 212 of the mobile base 210 to drive the at least one wheel 212, a seat actuator 228 disposed between the seat 220 and the mobile base 210 so as to actuate the seat 220 between the sitting disposition 220*a* and the standing disposition 220*b*, and a joystick 250 configured to control the at least one motor 218 for moving the mobile base 210. According to various embodiments, the actuation system may further include a steering actuator (not shown) configured for steering the mobile base 210. According to various embodiments, the joystick 250 may provide movement-input signals for generating motor-control signals and/or steering-control signals for moving the mobile base 210. Further, the mobility aid 200 of FIG. 2A to FIG. 2C may differ from the mobility aid 100 of FIG. 1A to FIG. 1B in that the mobility aid 200 of FIG. 2A to FIG. 2C may include a parallelogram linkage mechanism 240 (as elaborated further with reference to FIG. 4A and FIG. 4B) connecting the mobile base 210, the seat 220 and the balance-assist unit 230, whereby the seat actuator 228 and the parallelogram linkage mechanism 240 may together form a sit-to-stand mechanism 241 of the mobility aid 200.

As shown in FIG. 2A, according to various embodiments, in the 'sitting mode', the mobility aid 200 may perform the functions of a powered wheelchair in which the user 204 may sit on the seat 220 and be moved around by the mobile base 210. Accordingly, the mobility aid 200 may be used to move the user 204 around via the mobile base 210 while the user 204 is sitting on the seat 220 of the mobility aid 200.

As shown in FIG. 2B, according to various embodiments, in the 'transfer mode', the sit-to-stand mechanism 241 of the mobility aid 200 may provide assistance to the user 204 during the transition from sitting to standing. Accordingly, the mobility aid 200 may be used to assist the user 204 to stand up from a sitting posture.

As shown in FIG. 2C, according to various embodiments, in the 'following mode', the mobility aid 200 may be capable of following the user's movement by tracking the user movements. Accordingly, the mobility aid 200 may track and follow the user when the user is walking normally. At the same time, the balance-assist unit 230 may compliantly follow the user 204 and may not hinder the natural movement of the user 204 when the user 204 is walking normally.

According to various embodiments (not shown), the mobility aid 200 may have a 'balance mode' in which actuation may be provided to the user 204 by the balance-assist unit 230 of the mobility aid 200 when a fall detection algorithm detects fall from the balance-assist unit 230.

Figure 3C:
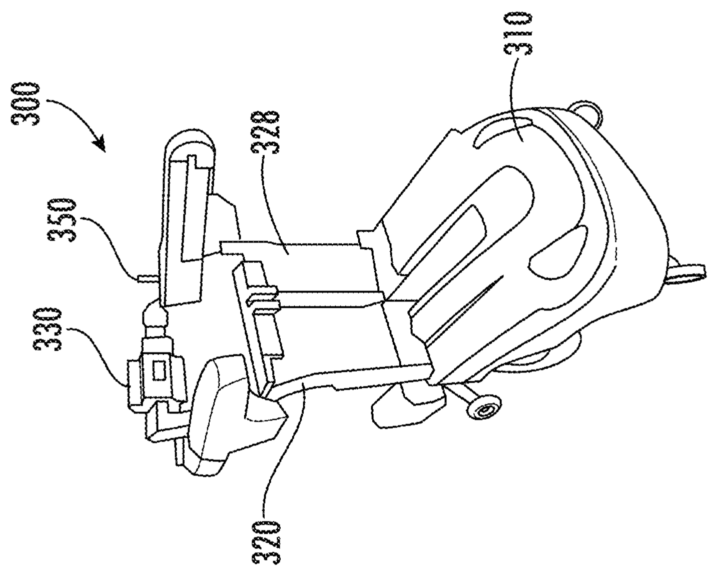
FIG. 3B and FIG. 3C show photographs of two different views of the mobility aid of FIG. 3A in a 'standing mode' according to various embodiments.
Figure 3B:
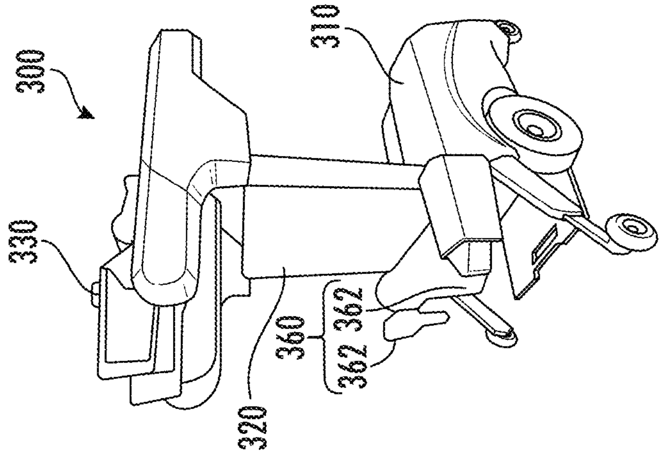
Figure 3A:
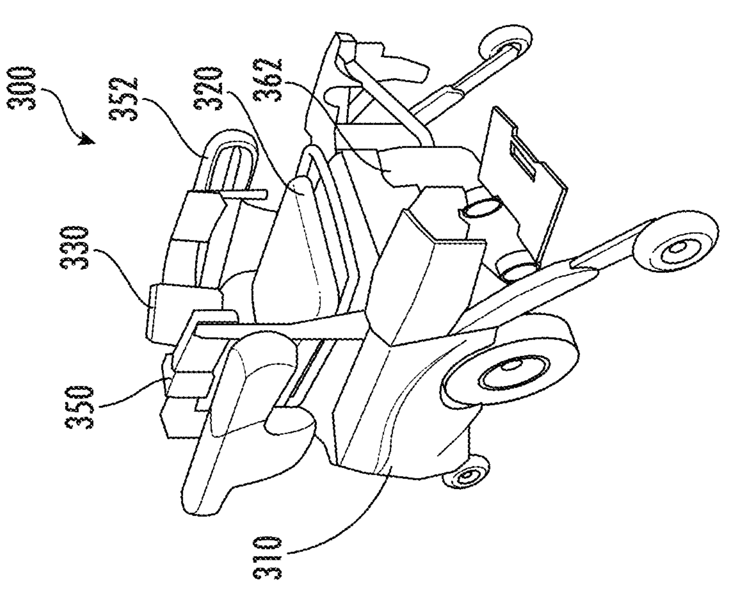
FIG. 3A shows a photograph of a mobility aid in a 'sitting mode' according to various embodiments.

FIG. 3A shows a photograph of a mobility aid 300 in a 'sitting mode' according to various embodiments. FIG. 3B and FIG. 3C show photographs of two different views of the mobility aid 300 in a 'standing mode' according to various embodiments. As shown, the mobility aid 300 may, similar to the mobility aid 100 of FIG. 1A and FIG. 1B as well as the mobility aid 200 of FIG. 2A to FIG. 2C, include a mobile base 310, a seat 320 and a balance-assist unit 330. As shown, the mobility aid 300 may, similar to the mobility aid 200 of FIG. 2A to FIG. 2C, include a joystick 350 configured to control and/or steer the movements of the mobile base 310. Accordingly, the user can use the joystick 350 to control the mobility aid 300 in a manner similar to that of controlling a conventional powered wheel chair or mobility scooter. Further, as shown in FIG. 3A, the mobility aid 300 may include a user interface, for example a push button interface 352, configured to control a seat actuation 328 for pivoting the seat 320. Accordingly, the user can use the push button interface 352 to change the mobility aid 300 from sit to stand or stand to sit. According to various embodiments, the push button interface 352 may provide a seat-actuation-input signal for generating the seat-actuation-control signal to actuate and pivot the seat 320.

According to various embodiments, the use of a powered wheel chair or a mobility scooter as a base platform (or the mobile base 110, 210, 310) for the mobility aid 100, 200, 300 may allow the user 204 to perform a wide variety of ADL at home with only one single piece of mobility aid. The functions of the mobile base 110, 210, 310 may be twofold: to provide a stable base to support the body weight of the user and to house the necessary equipment to control the robot; and to follow closely behind a user such that the user is within the task space of the balance-assist unit 130, 230, 330.

Figure 4B:
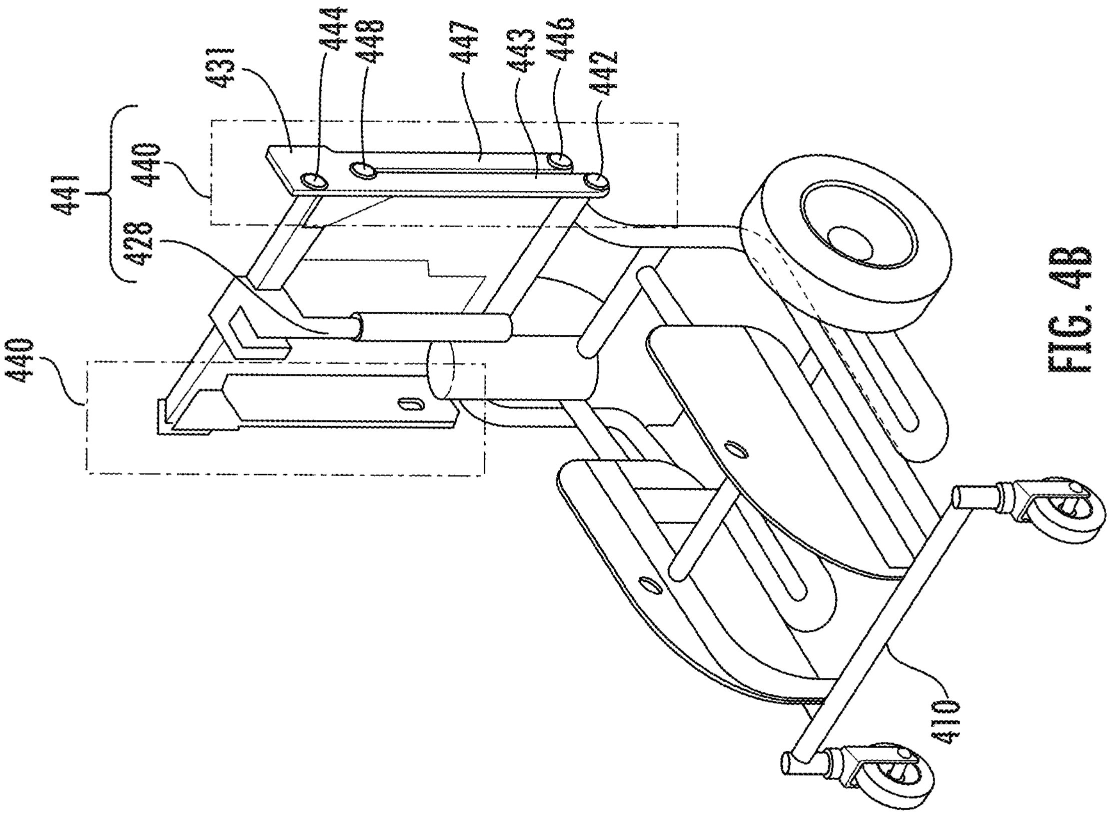
FIG. 4A and FIG. 4B show schematic diagrams illustrating the working principle of a sit-to-stand mechanism of a mobility aid for pivoting a seat with respect to a mobile base according to various embodiments.
Figure 4A:
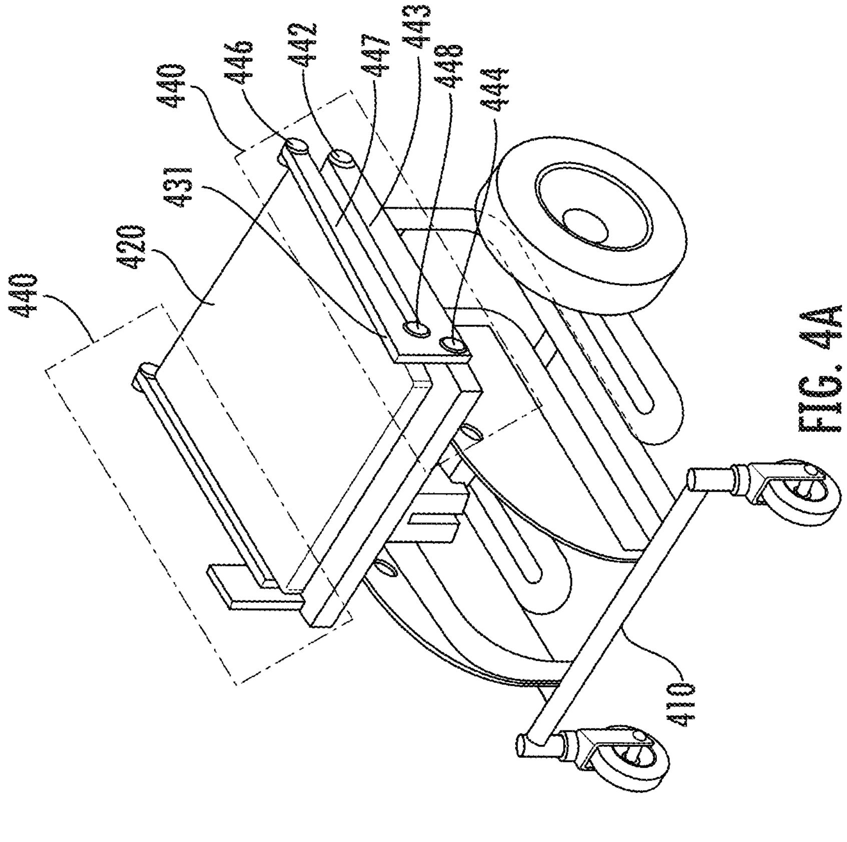

FIG. 4A and FIG. 4B show schematic diagrams illustrating the working principle of a sit-to-stand mechanism 441, similar to the sit-to-stand mechanism 241 of FIG. 2A to FIG. 2C, for pivoting a seat 420 with respect to a mobile base 410 according to various embodiments. According to various embodiments, the sit-to-stand mechanism 441 may be applied to the mobility aid 100, 200, 300 of the various embodiments. According to various embodiments, the sit-to-stand mechanism 441 may include two parts: a parallelogram linkage mechanism 440 and a seat actuator 428. According to various embodiments, the seat actuator 428 may be a linear actuator. According to various embodiments, the parallelogram linkage mechanism 440 may be used to keep the balance-assist unit 130, 230, 330 of the mobility aid 100, 200, 300 always horizontal with respect to the ground 102 (see FIG. 1A, 1B, 2A to 2C, 3A to 3C). According to various embodiments, the linear actuator (i.e. the seat actuator 428) may form with the parallelogram linkage mechanism 440 as a four-bar linkage as shown in FIG. 4B. When the linear actuator (i.e. the seat actuator 428) extends, the sit-to-stand mechanism 441 may lift the seat 420 from a horizontal position (i.e. a sitting disposition) to a vertical position (i.e. a standing disposition), thereby assisting the user from sit to stand. When the linear actuator (i.e. the seat actuator 428) contracts, the sit-to-stand mechanism 441 may pull the seat 420 from the vertical position (i.e. the standing disposition) to the horizontal position (i.e. the sitting disposition), thereby assisting the user from stand to sit.

According to various embodiments, the parallelogram linkage mechanism 440 may connect the mobile base 410, the seat 420 and the balance-assist unit 130, 230, 330. In FIG. 4A and FIG. 4B, only a connection plate 431 of the balance-assist unit is show. However, as shown, an orientation of the connection plate 431 remains the same when the seat 420 is in the horizontal position (i.e. the sitting disposition) and the vertical position (i.e. the standing disposition). Accordingly, the parallelogram linkage mechanism 440 may be used to keep the balance-assist unit 130, 230, 330 of the mobility aid 100, 200, 300 always in a same orientation with respect to the mobile base 410 regardless of whether the seat 420 is in the horizontal position (i.e. the sitting disposition) or the vertical position (i.e. the standing disposition).

According to various embodiments, the parallelogram linkage mechanism 440 may include a pair of equal parallel links 443, 447 being disposed parallel to the seat 420. According to various embodiments, the seat 420 may be attached to one (or a first) of the pair of parallel links 443, 447. According to various embodiments, the seat 420 may be fixedly attached to the one of the pair of parallel links 443, 447 such that the seat 420 is firmly secured and may not move or rotate relative to the one of the pair of parallel links 443, 447. According to various embodiments, another (or a second) of the pair of parallel links 443, 447 may be free from any attachment to the seat 420 so as to be movable relative to the seat 420.

According to various embodiments, first and second pin joints 442, 446 of the parallelogram linkage mechanism 440 respectively at first longitudinal ends of the pair of parallel links 443, 447 may couple the seat 420 to the mobile base 410. Accordingly, the pair of parallel links 443, 447 may respectively be pivotable relative to the mobile base 410 about the first and second pin joints 442, 446. According to various embodiments, third and fourth pin joints 444, 448 of the parallelogram linkage mechanism 440 respectively at second longitudinal ends of the pair of parallel links 443, 447 may couple the seat 420 to the balance-assist unit. For example, as shown in FIG. 4A and FIG. 4B, coupling to the balance-assist unit may be via the connection plate 431. Accordingly, the pair of parallel links 443, 447 may respectively be pivotable relative to the balance-assist unit about the third and fourth pin joints 444, 448. As shown in FIG. 4A and FIG. 4B, according to various embodiments, the first and second pin joints 442, 446 as well as the third and fourth pin joints 444, 448 may be diagonally positioned with respect to a side profile of the seat 420. According to various embodiments, the configuration of the parallelogram linkage mechanism 440 may allow an orientation of the balance-assist-linkage mechanism 132, 232 of the balance-assist unit 130, 230, 330 with respect to the mobile base 410 to remain unchanged when the seat 420 is pivoted about the first and second pin joints 442, 446 simultaneously to move the seat 420 between the sitting disposition and the standing disposition with respect to the mobile base 410.

Figure 5D:
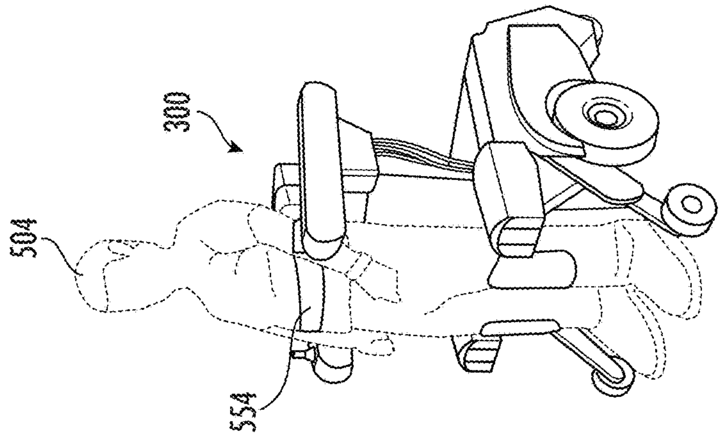
FIG. 5A to FIG. 5D show photographs illustrating a sequence of motion of the mobility aid of FIG. 3A to 3C with a user demonstrating an operation of the sit-to-stand mechanism according to various embodiments.
Figure 5C:
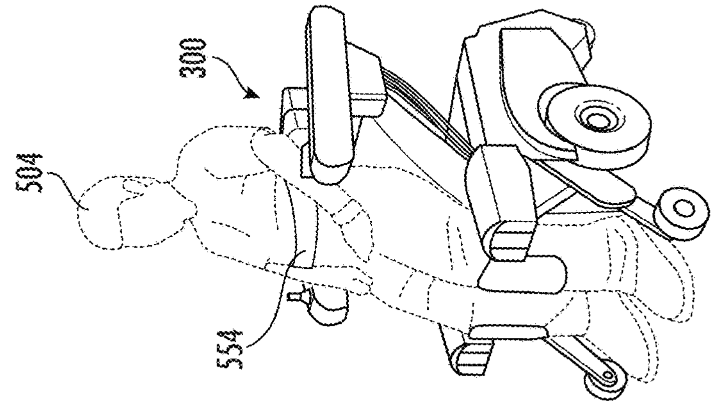
Figure 5B:
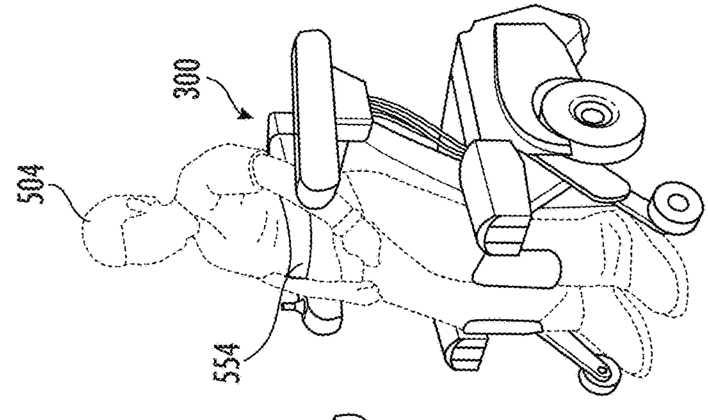
Figure 5A:
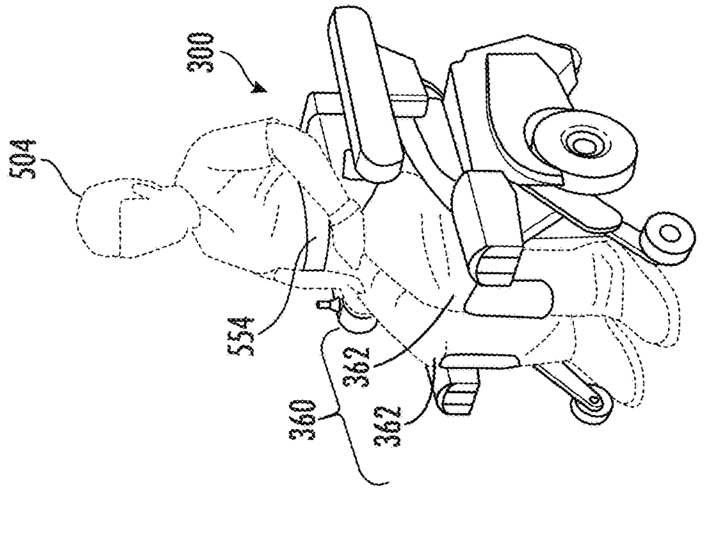

FIG. 5A to FIG. 5D show photographs illustrating a sequence of motion of the mobility aid 300 of FIG. 3A to 3C with a user 504 demonstrating an operation of the sit-to-stand mechanism 241, 441 according to various embodiments. FIG. 5A shows the mobility aid 300 in the sitting disposition. FIG. 5B and FIG. 5C shows the mobility aid 300 transiting from the sitting disposition to the standing disposition. FIG. 5D shows the mobility aid 300 in the standing disposition.

As shown in FIG. 5A to FIG. 5D, as well as in FIG. 3A and FIG. 3B, the mobility aid 300 may include a shank support mechanism 360 (or a leg support mechanism). According to various embodiments, the shank support mechanism 360 may be at a front portion of the mobile base 310 with respect to the forward-movement direction of the mobile base 310. According to various embodiments, the shank support mechanism 360 may include a pair of shank support plates 362. According to various embodiments, each of the pair of shank support plates may be shaped or configured to receive a shank portion of a leg of the user 504. According to various embodiments, the shank support mechanism 360 may include a movement mechanism (for example, see 664 in FIG. 6A to FIG. 6G) configured to move the pair of shank support plates between an open position and a close position. According to various embodiments, in the open position, the pair of shank support plates 362 may be moved apart from each other such that a space in front of the front portion of the mobile base 310 may be unobstructed by the pair of shank support plates 362. According to various embodiments, in the closed position, the pair of shank support plates 362 may be moved towards each other such that the pair of shank support plates 362 is positioned in front of the front portion of the mobile base 310 (for example, as shown in FIG. 5A to FIG. 5D, as well as in FIG. 3A and FIG. 3B).

FIG. 6A to FIG. 6G show various schematic diagrams illustrating the working principle of a shank support mechanism 660, similar to the shank support mechanism 360 of FIG. 3A and FIG. 3B, as well as FIG. 5A to FIG. 5D, for supporting the shank portion of the leg of the user 504 during the transition from sitting to standing with the assistance from the mobility aid 300 according to various embodiments.

According to various embodiments, the shank support mechanism 360, 660 may be configured to prevent the user 504 from falling forward during the sit to stand process. Referring to FIG. 6A to FIG. 6G, according to various embodiments, there may be a motor 666 in the shank support mechanism 660, which may be used to move a shank support plate 662 (or an interface) from open to close and close to open as shown. According to various embodiments, the motor 666 may be controlled to open and/or close the shank support plate 662 based on a motor-control signal. According to various embodiments, the shank support mechanism 660 may be configured to automatically close before the user 504 starts to stand in a manner such that the shank support plate 662 may touch or contact the shank portion of the leg of the user 504. Accordingly, the shank support plate 662 may provide support to the user 504 during transition from sitting to standing. According to various embodiments, the motor-control signal to close the shank support plate 662 may be generated simultaneously with the seat-actuation-control signal to pivot the seat. According to various embodiments, the shank support mechanism 660 may be configured to automatically open when the user 504 finishes the sit to stand process so that it does not hinder further movements of the user's leg. According to various embodiments, the motor-control signal to close the shank support plate 662 may be generated automatically after the seat is in pivoted to the standing disposition.

Figures 6A, 6B, 6C, 6D, 6E, 6F, 6G:
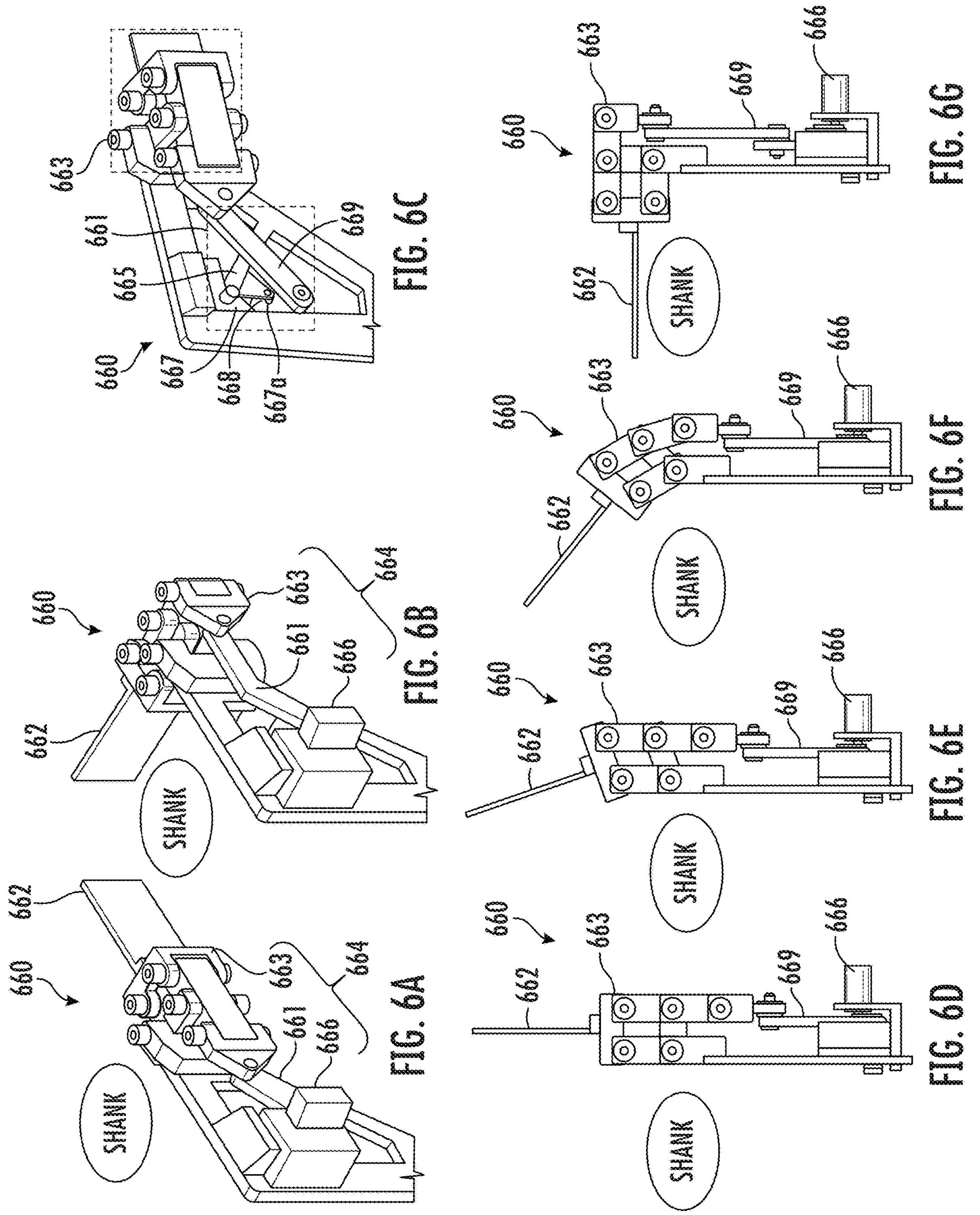
FIG. 6A to FIG. 6G show various schematic diagrams illustrating the working principle of a shank support mechanism of the mobility device of FIG. 3A and FIG. 3B for supporting the shank portion of the leg of the user during the transition from sitting to standing with the assistance from the mobility aid according to various embodiments.

Details of the shank support mechanism 660 is shown in FIG. 6C with the motor 666 removed. According to various embodiments, the shank support mechanism 660 may include two linkage assemblies 661, 663 connected in sequence to transfer a rotation of the motor 666 into an opening and closing movement of the shank support plate 662. According to various embodiments, the movement mechanism 664 of the shank support mechanism 660 may include the motor 666, the first linkage assembly 661 and the second linkage assembly 663. The first linkage assembly 661 may be connected to the motor 666, the second linkage assembly 663 may be connected to the first linkage assembly 661 and the shank support plate 662 may be connected to the second linkage assembly 663. According to various embodiments, in the first linkage assembly 661, the motor 666 may be coupled directly to a first link 665 for driving the first link 665. According to various embodiments, the first linkage assembly 661 may transmit the movement from the first link 665 through a second link 667 to a third link 669. According to various embodiments, the second link 667 may include a slot 667*a* along its length. According to various embodiments, the first link 665 may be coupled to the motor 666 at its first end and may include a round pin 668 at its second end. According to various embodiments, the round pin 668 of the first link 665 may be inserted into the slot 667*a* of the second link 667. Accordingly, the first link 665 may be connected to the second link 667 via the round pin 668 and the slot 667*a*. According to various embodiments, the second link 667 may be connected to the third link 667 via a revolute joint. According to various embodiments, the third link 667 may move the second linkage assembly 663, which is a four bar linkage mechanism, to perform the opening and closing action of the shank support plate 662. FIG. 6D to FIG. 6G illustrate an operation of the second linkage assembly 663 for closing the shank support plate 662 from the open position to the close position.

Figure 7B:
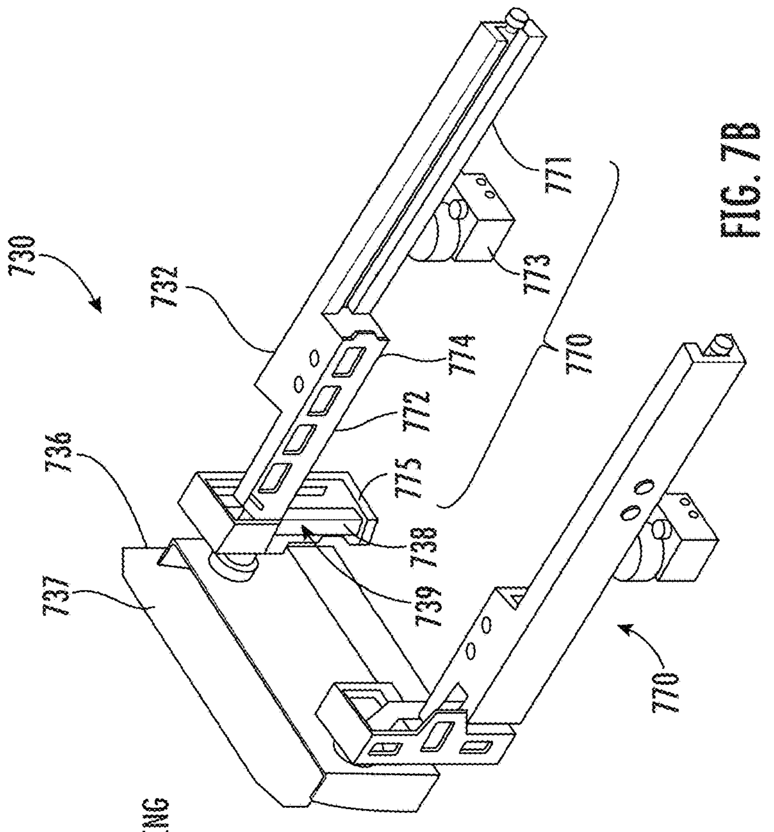
FIG. 7B shows a balance-assist unit of the mobility aid of FIG. 7A according to various embodiments.
Figure 7A:
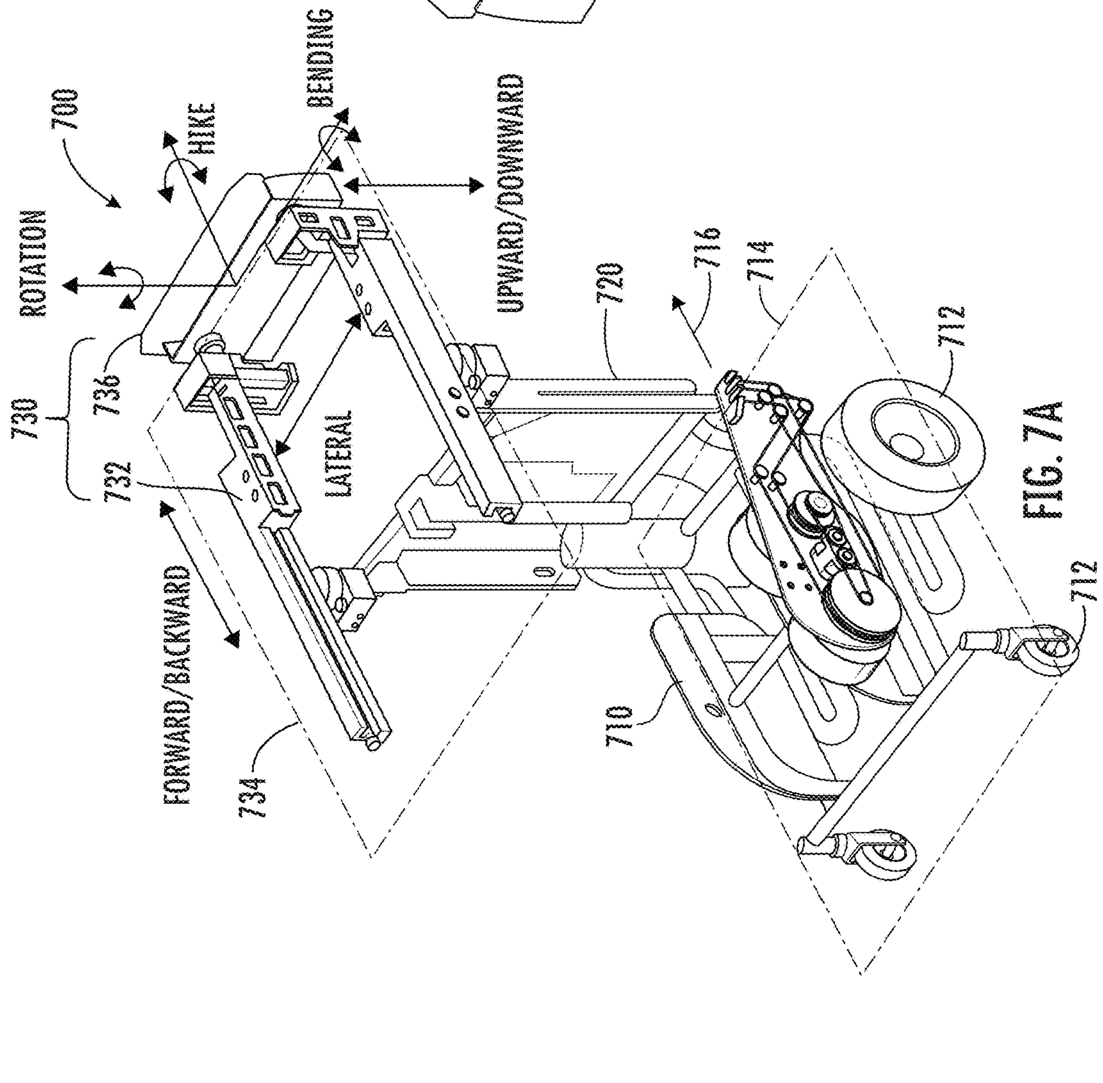
FIG. 7A shows a schematic diagram of a mobility aid according to various embodiments.

FIG. 7A shows a schematic diagram of a mobility aid 700 according to various embodiments. According to various embodiments, the mobility aid 700 may, similar to the mobility aid 100 of FIG. 1A and FIG. 1B as well as the mobility aid 200 of FIG. 2A to FIG. 2C and the mobility aid 300 of FIG. 3A to FIG. 3C, include a mobile base 710, a seat 720, and a balance-assist unit 730 (or a balance assistive mechanism). According to various embodiments, the mobile base 710 may, similar to the mobile base 110, 210, 310, 410, be movable along a mobile-base-movement plane 714 and may include a plurality of wheels 712. According to various embodiments, the seat 720 may, similar to the seat 120, 220, 320, 420, be pivotally coupled to the mobile base 710 in a manner so as to be pivotable between a sitting disposition and a standing disposition. According to various embodiments, the balance-assist unit 730 may, similar to the balance-assist unit 130, 230, 330, include a balance-assist-linkage mechanism 732 coupled to the seat 720 and a body-support-module 736 coupled to the balance-assist-linkage mechanism 732. FIG. 7B shows the balance-assist unit 730 of the mobility aid 700 according to various embodiments.

According to various embodiments, the balance-assist unit 730 may be configured to couple with the user body, e.g. the pelvis, via a body-support member 737 of the body-support-module 736. According to various embodiments, the balance-assist unit 730 may be configured to provide the body-support-member 737 with six degree-of-freedom including three translational movements: forward/backward, lateral, upward/downward; and three rotational movements: rotation (i.e. yaw), bending (i.e. pitch), and hike (i.e. roll) which are shown in FIG. 7A. According to various embodiments, the main functions of the balance-assist unit 730 are: to monitor the movement of the user, to provide body weight support to the user, and to provide balance assistance to the user.

According to various embodiments, the balance-assist-linkage mechanism 732 of the balance-assist unit 730 may be configured to provide the body-support-module 736 with a three degree-of-freedom relative to the seat 720 along a module-movement-plane 734, the module-movement plane 734 being parallel to the mobile-base-movement plane 714 of the mobile base 710. According to various embodiments, the three degree-of-freedom provided by the balance-assist-linkage mechanism 732 may include forward and backward movements which are parallel to the forward-movement direction 716 of the mobile base 710 and along the module-movement-plane 734, lateral movements which are perpendicular to the forward and backward movements and along the module-movement-plane 734, and yaw movements about a support-module-rotational axis which is perpendicular to the module-movement-plane 734.

According to various embodiments, the balance-assist-linkage mechanism 732 of the balance-assist unit 730 may include a pair of arms assemblies 770 (or robotic arms). According to various embodiments, each arm assembly 770 of the balance-assist-linkage mechanism 732 may include a first link member 771 and a second link member 772. According to various embodiments, the first link member 771 may be rotatable about a first revolute joint 773 having a first rotational axis perpendicular to the module-movement-plane. According to various embodiments, the first revolute joint 773 may connect the first link member 771 to the seat 720. For example, the revolute joint 773 may be mounted to the connection plate 431 of FIG. 4A and FIG. 4B so as to be coupled to the seat 720 in the manner as described previously. According to various embodiments, the second link member 772 may be in sliding engagement with the first link member 771 via a prismatic joint 774 having a sliding axis along or parallel to the module-movement-plane. According to various embodiments, the body-support-module 736 may be connected to the second link member 772 via a second revolute joint 775 having a second rotational axis perpendicular to the module-movement-plane.

Figure 8C:
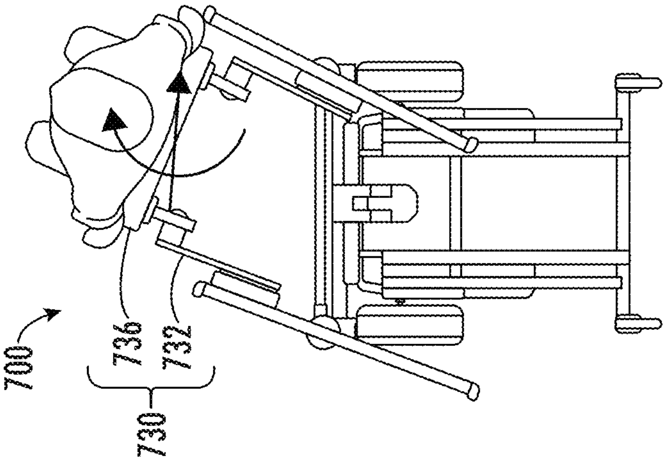
FIG. 8A to FIG. 8C show schematic diagrams illustrating the three degree-of-freedom movements provided by the balance-assist-linkage mechanism of the balance-assist unit of FIG. 7B according to various embodiments.
Figure 8B:
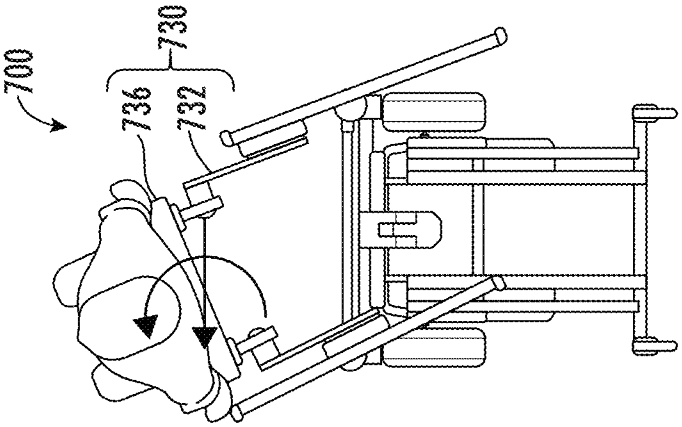
Figure 8A:
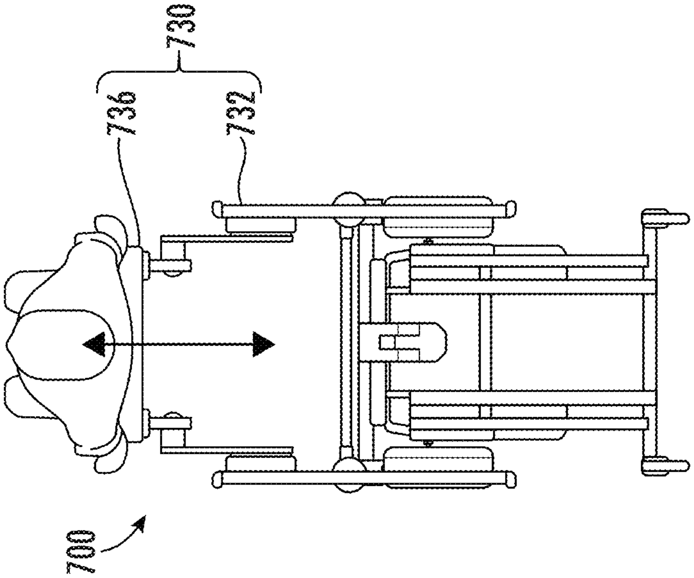

According to various embodiments, the balance-assist-linkage mechanism 732 may include four link members 771, 772, four revolute joints 773, 775 (or rotatory joints), and two prismatic joint 774 (or linear joint) forming a planar three degree-of-freedom mechanism which may be used to the forward/backward, lateral and rotation (or yaw) motion as shown in FIG. 8A to FIG. 8C. Accordingly, the pair of arm assemblies 770 of the balance-assist-linkage mechanism 732 coupling the body-support-module 736 to the seat 720 may form the planar three degree-of-freedom mechanism.

FIG. 8A to FIG. 8C show schematic diagrams illustrating the three degree-of-freedom movements provided by the balance-assist-linkage mechanism 732 of the balance-assist unit 730 according to various embodiments. FIG. 8A shows the forward and backward movements of the body-support-module 736 of the mobility aid 700 according to various embodiments. FIG. 8B shows the lateral and rotation (yaw) movements of the body-support-module 736 to one side according to various embodiments. FIG. 8C shows the lateral and rotation (yaw) movements of the body-support-module 736 to another side according to various embodiments.

According to various embodiments, the balance-assist unit 730 may also be configured to allow, for example, pelvis up-down motion, pelvis hiking and pelvic bending of the user. According to various embodiments, this may be realized by the body-support-module 736. Referring back to FIG. 7B, according to various embodiments, the body-support-module 736 may include a connection structure 738 which couples the body-support-module 736 to the balance-assist-linkage mechanism 732. According to various embodiments, the body-support-module 736 may include the body-support-member 737. According to various embodiments, the body-support-module 736 may include a support-member-movement mechanism 739 which couples the body-support-member 737 to the connection structure 738. According to various embodiments, the support-member-movement mechanism 739 may be configured to provide the body-support-member 737 with three degree-of-freedom relative to the connection structure 738. According to various embodiments, the three degree-of-movement provided by support-member-movement mechanism 739 may include upward and downward movements perpendicular to the module-movement-plane of the balance-assist-linkage mechanism 732, roll movements (or hike movements) about a roll axis extending perpendicularly from a body contact surface of the body-support-member 737, and pitch movements (or bending movements) about a pitch axis perpendicular to both the roll axis and upward and downward movements.

According to various embodiments, the connecting structure 738 of the body-support-module 736 may be part of the revolute joint 775 connecting the second link member 772 of the balance-assist-linkage mechanism 732 to the body-support-module 736. According to various embodiments, the support-member-movement mechanism 739 may include a prismatic joint (or linear joint) connecting the connection structure 738 to the body-support-member 737. According to various embodiments, the prismatic joint may be arranged perpendicular to the module-movement-plane of the balance-assist-linkage mechanism 732. According to various embodiments, the prismatic joint may include a spring to provide compliant body weight support. According to various embodiments, since the balance-assist-linkage mechanism 732 include a pair of arm assemblies 770 connected to the body-support-module 736, the body-support-module 736 may include a pair of connecting structures 738, and a pair of support-member-movement mechanisms 739 connecting the pair of connecting structures 738 to the body-support-member 737. According to various embodiments, the pair of support-member-movement mechanisms 739 in the form of prismatic joints (or linear joints) may provide the upward and downward movements as well as the roll movements (or hike movements). According to various embodiments, the pitch movements (or bending movements) may be achieved via a slot connection between the body-support-member 737 and the support-member-movement mechanisms 739.

According to various embodiments, the balance-assist unit 730, including the balance-assist-linkage mechanism 732 and the body-support-module 736, may include the four link members 771, 772, the four revolute joints 773, 775 (or rotatory joints), and the four prismatic joints 774, 739 (or linear joints) to provide the body-support-member 737 with a six degree-of-freedom with respect to the mobility base 710. Accordingly, the body part (e.g. pelvis) of the user secured to the body-support-member 737 may perform motions with a six degree-of-freedom.

According to various embodiments, the balance-assist unit 730 of the mobility aid 700 may be configured to afford the range of motion, illustrated in the following table, to the body part (e.g. pelvis) of the user secured to the body-support-member 737.

TABLE I

Range of motion afforded by the balance-assist unit 730 for pelvis

| Pelvis motion | Range of Motion |
|---|---|
| Forward/Backward | −200 mm to +200 mm |
| Lateral | −150 mm to +150 mm |
| Upward/Downward | −50 mm to +50 mm |
| Rotation (i.e. yaw) | −60° to +60° |
| Bending (i.e. pitch) | −20° to +20° |
| Hike (i.e. roll) | −20° to +20° |

Figure 9A:
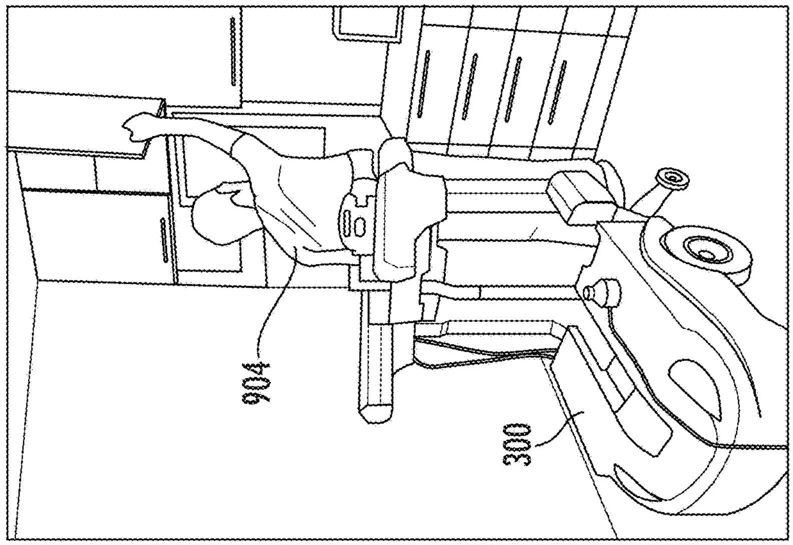
FIG. 9A to FIG. 9C show photographs demonstrating six degree-of-freedom pelvis motion of a user using the mobility aid of FIG. 3A to FIG. 3C for performing reaching out tasks from three different height according to various embodiments.
Figure 9B:
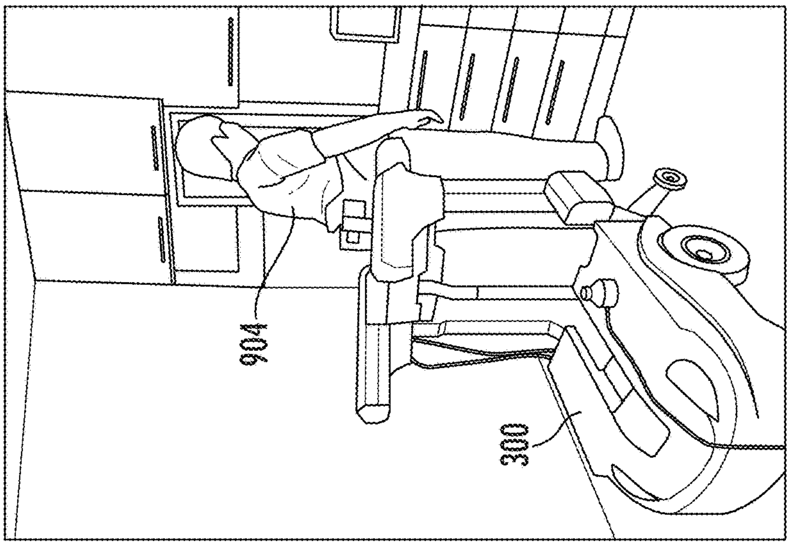
Figure 9C:
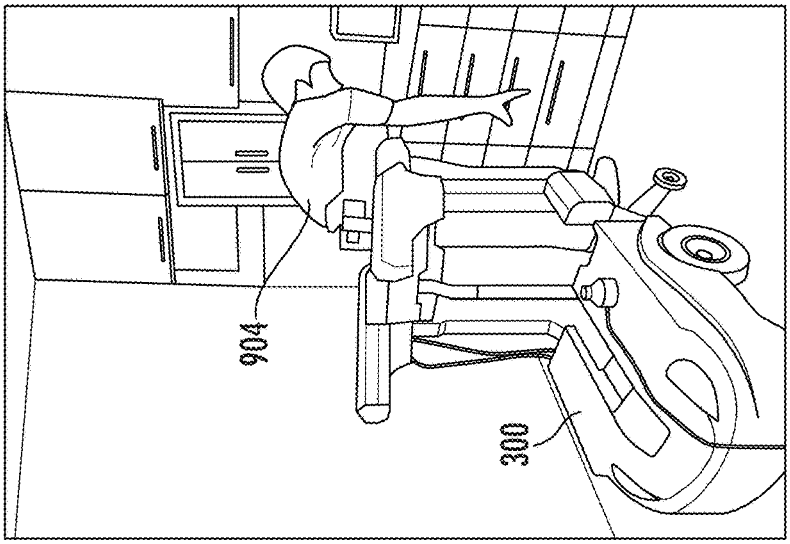

FIG. 9A to FIG. 9C show photographs demonstrating six degree-of-freedom pelvis motion of a user 904 using the mobility aid 300 of FIG. 3A to FIG. 3C for performing reaching out tasks from three different height according to various embodiments. FIG. 9A shows the user 904 reaching high, FIG. 9B shows the user 904 reaching forward and FIG. 9C shows the user 904 reaching low.

Figure 10B:
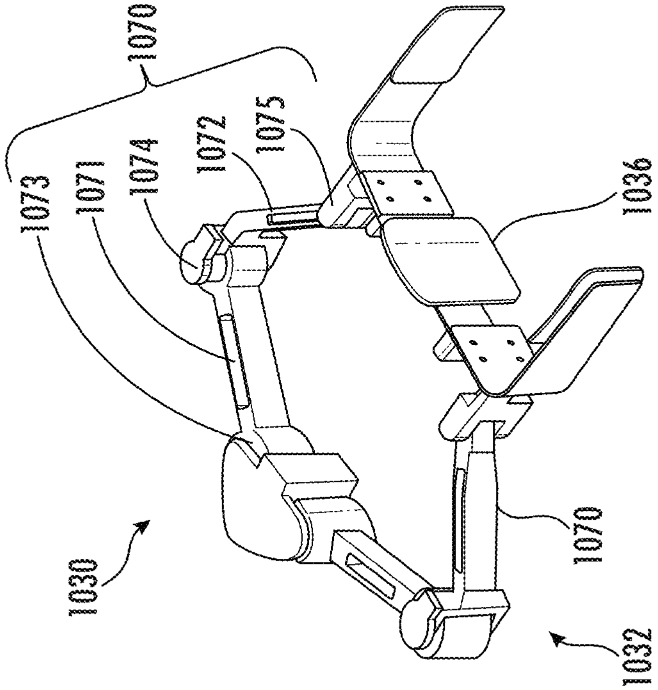
FIG. 10A and FIG. 10B show schematic diagrams of a balance-assist unit according to various embodiments.
Figure 10A:
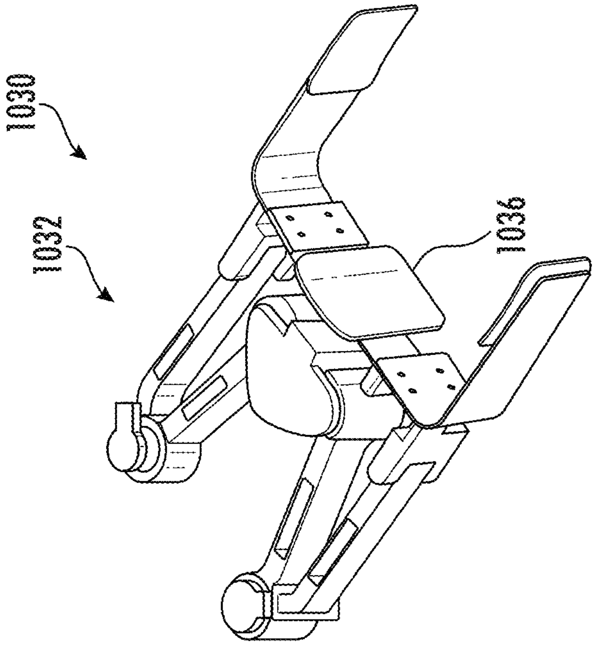

FIG. 10A and FIG. 10B show schematic diagrams of a balance-assist unit 1030 according to various embodiments. FIG. 10A shows the balance-assist unit 1030 in a retracted state. FIG. 10B shows the balance-assist unit 1030 in an extended state. According to various embodiments, the balance-assist unit 1030 may, similar to the balance-assist unit 130, 230, 330, 730 include a balance-assist-linkage mechanism 1032 and a body-support-module 1036 coupled to the balance-assist-linkage mechanism 1032. According to various embodiments, the balance-assist unit 1030 in FIG. 10A and FIG. 10B illustrates a variant of the balance-assist-linkage mechanism 1032 and the body-support-module 1036 which differ from the balance-assist unit 730 in FIG. 7B.

According to various embodiments, the balance-assist-linkage mechanism 1032 of the balance-assist unit 1030 may, similar to the balance-assist-linkage mechanism 732, be configured to provide the body-support-module 1036 with a three degree-of-freedom relative to the seat along a module-movement-plane, the module-movement plane being parallel to the mobile-base-movement plane of the mobile base. According to various embodiments, the three degree-of-freedom provided by the balance-assist-linkage mechanism 1032 may, similar to that provided by the balance-assist-linkage mechanism 732, include forward and backward movements which are parallel to the forward-movement direction of the mobile base and along the module-movement-plane, lateral movements which are perpendicular to the forward and backward movements and along the module-movement-plane, and yaw movements about a support-module-rotational axis which is perpendicular to the module-movement-plane.

According to various embodiments, the balance-assist-linkage mechanism 1032 of the balance-assist unit 1030 may include a pair of arms assemblies 1070 (or robotic arms). According to various embodiments, each arm assembly 1070 of the balance-assist-linkage mechanism 1032 may include a first link member 1071 and a second link member 1072. According to various embodiments, the first link member 1071 may be rotatable about a first revolute joint 1073 having a first rotational axis perpendicular to the module-movement-plane. According to various embodiments, the first revolute joint 1073 may connect the first link member 1071 to the seat. For example, the first revolute joint

1073 may be connected to the connection plate 431 of FIG. 4A and FIG. 4B so as to be coupled to the seat in the manner as described previously. According to various embodiments, the second link member 1072 may be connected and rotatable relative to the first link member 1071 via a second revolute joint 1074 having a second rotational axis perpendicular to the module-movement-plane. According to various embodiments, the body-support-module 1036 may be connected to the second link member 1072 via a third revolute joint 1075 having a third rotational axis perpendicular to the module-movement-plane.

Figure 11C:
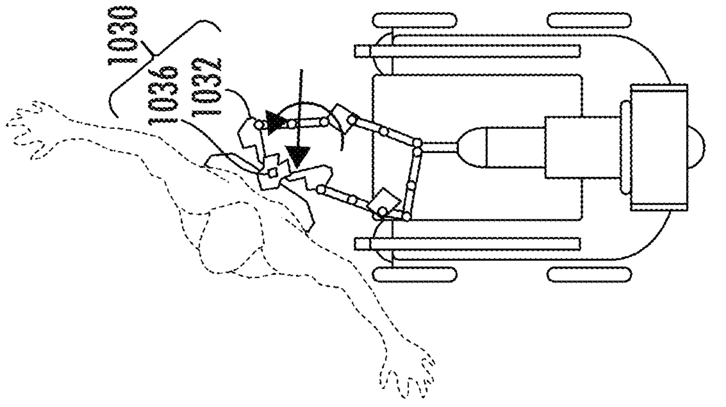
FIG. 11A to FIG. 11C show schematic diagrams illustrating the three degree-of-freedom movements provided by the balance-assist-linkage mechanism of the balance-assist unit of FIG. 10A and FIG. 10B according to various embodiments.
Figure 11B:
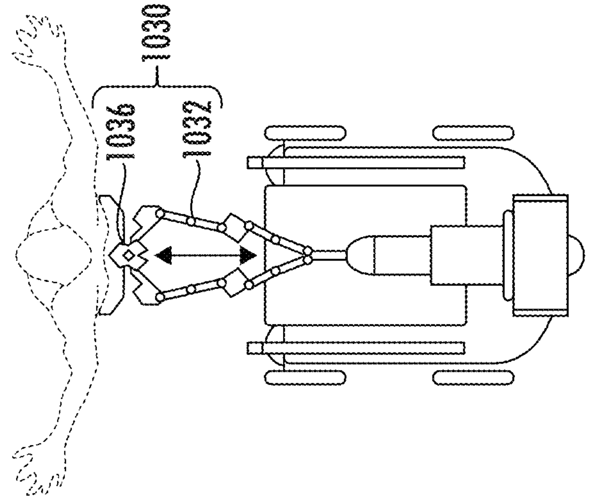
Figure 11A:
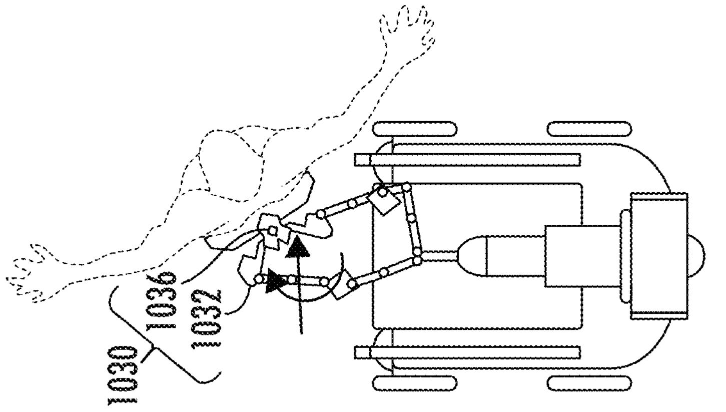
Figure 12A:
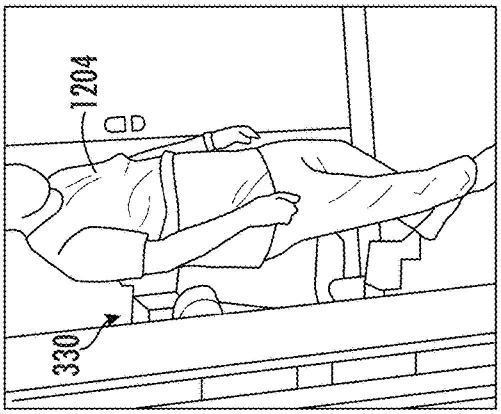
FIG. 12A to FIG. 12F show photographs demonstrating the mobility aid of FIG. 3A to FIG. 3C following a user based on joints information of the balance-assist unit detected by the various position sensors according to various embodiments.
Figure 12B:
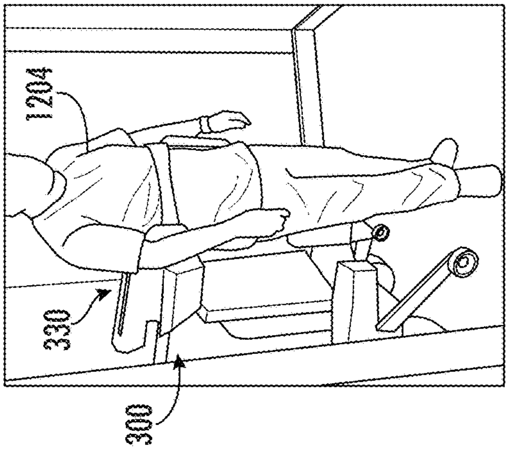
Figure 12C:
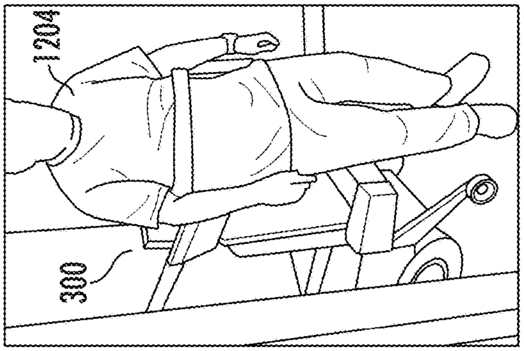
Figure 12D:
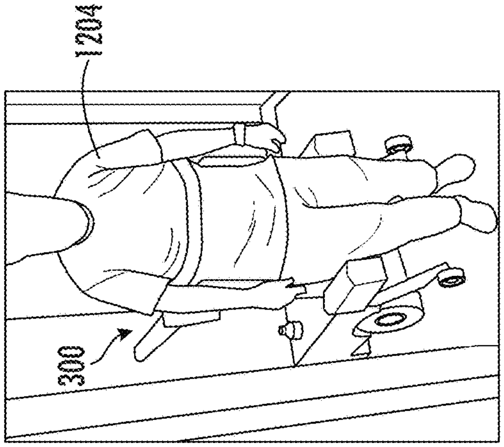
Figure 12E:
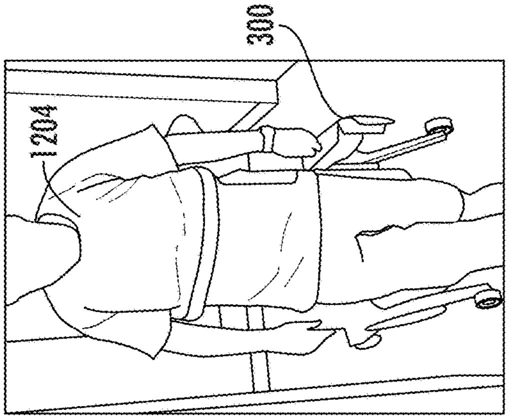
Figure 12F:
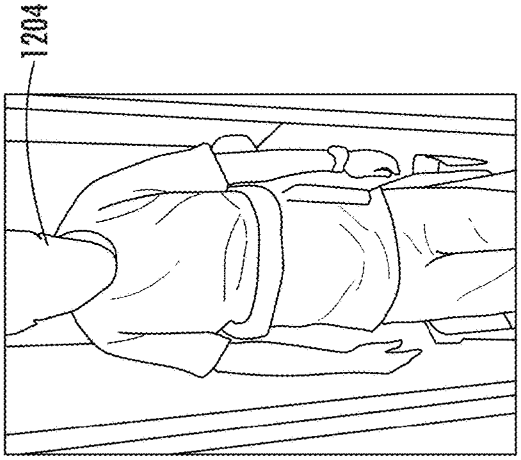

According to various embodiments, the balance-assist-linkage mechanism 1032 may include four link members 1071, 1072, and six revolute joints 1073, 1074, 1075 (or rotatory joints) forming a planar three degree-of-freedom mechanism which may be used to the forward/backward, lateral and rotation (or yaw) motion as shown in FIG. 11A to FIG. 11C. Accordingly, the pair of arm assemblies 1070 of the balance-assist-linkage mechanism 1032 coupling the body-support-module 1036 to the seat may form the planar three degree-of-freedom mechanism.

FIG. 11A to FIG. 11C show schematic diagrams illustrating the three degree-of-freedom movements provided by the balance-assist-linkage mechanism 1032 of the balance-assist unit 1030 according to various embodiments. FIG. 11A shows the forward and backward movements of the body-support-module 1036 according to various embodiments. FIG. 11B shows the lateral and rotation (yaw) movements of the body-support-module 1036 to one side according to various embodiments. FIG. 11C shows the lateral and rotation (yaw) movements of the body-support-module 1036 to another side according to various embodiments.

According to various embodiments, the body-support-module 136, 236, 736, 1036 may include a securing component 554 (see FIG. 5D) for connecting a user to the balance-assist unit 130, 230, 330, 730, 1030. According to various embodiments, the securing component 554 may include a belt. According to various embodiments, the belt may be worn at the waist to connect the user to the balance-assist unit 130, 230, 330, 730, and 1030. According to various embodiments, the belt may be configured to be worn easily with a quick attachment and release buckle with the body-support-module 136, 236, 736, and 1036. According to various embodiments, the securing component 554 may include a quick attachment and release buckle. According to various embodiments, by attaching the balance-assist unit 130, 230, 330, 730, 1030 to the user's waist or pelvis, the waist/pelvis movements of the user may be monitored.

According to various embodiments, the balance-assist unit 130, 230, 330, 730, and 1030 may include a sensor arrangement configured to detect movements of the balance-assist unit 130, 230, 330, 730, and 1030. According to various embodiments, the sensor arrangement may include at least one position sensor attached to the balance-assist-linkage mechanism 132, 232, 732, and 1032. According to various embodiments, the at least one position sensor may include potentiometer, or encoders, or displacement sensor, or other suitable position sensor attached to at least one joint of the balance-assist-linkage mechanism 132, 232, 732, 1032. According to various embodiments, the at least one position sensor may provide a detection signal indicating a movement of the at least one joint of the balance-assist-linkage mechanism 132, 232, 732, 1032. For example, position sensors may be attached to the revolute joints 773, 775 and the prismatic joint 774 as shown in FIG. 7B, as well as the revolute joints 1073, 1074, 1075 as shown in FIG. 10A and FIG. 10B, for measuring movement of the joints as a measure to monitor the movement of the user. According to various embodiments, the mobility aid 100, 200, 300, 700 may be configured to perform automatic following of the user by utilizing the human waist/pelvis movements' information detected by the position sensors of the balance-assist unit 130, 230, 330, 730, and 1030. According to various embodiments, the motor-control signal and/or the steering-control signal for moving the mobility aid 100, 200, 300, 700 may be generated based on the detection signals from the position sensors. According to various embodiments, the at least one position sensor may be used to determine or monitor the position and velocity of the Center of Mass (CoM) of the user which may then be used to predict whether the user is going to fall. For example, position sensors may be placed at the joints 773, 774, 775, 1073, 1074, 1075 of the balance-assist-linkage mechanism 132, 232, 732, 1032. Detection signals from the position sensors indicating joint angles and/or joint displacement/rotation measured by the position sensors may be used to determine or calculate the CoM position and CoM velocity based on robotic arm kinematics. Accordingly, CoM position may be determined or calculated from the joint positions information using robotic arm kinematics. Further, CoM velocity may be determined or calculated by taking derivative of the CoM position with respect to time. According to various embodiments, the mobility aid 100, 200, 300, 700 may be configured to control a degree of stiffness of the balance-assist-linkage mechanism 132, 232, 732, 1032 based on the determined CoM position and CoM velocity using information from the at least one position sensor. According to various embodiments, stiffness control of the balance-assist-linkage mechanism 132, 232, 732, 1032 may be based on the detection signal from the at least one position sensor.

FIG. 12A to FIG. 12F show photographs demonstrating the mobility aid 300 of FIG. 3A to FIG. 3C following a user 1204 based on joints information of the balance-assist unit 330 detected by the various position sensors according to various embodiments.

According to various embodiments, the sensor arrangement may include at least one inertial measurement unit or accelerometer placed at a front end of the balance-assist unit 130, 230, 330, 730, and 1030. According to various embodiments, the at least one inertial measurement unit or accelerometer may be attached to the body-support-module 136, 236, 736, and 1036. According to various embodiments, the at least one inertial measurement unit or accelerometer may be used to determine or monitor the acceleration of the Center of Mass (CoM) of the user which may be used to predict whether the user is going to fall. According to various embodiments, the at least one inertial measurement unit or accelerometer may generate a detection signal indicating the CoM acceleration of the user. According to various embodiments, the mobility aid 100, 200, 300, 700 may be configured to control a degree of stiffness of the balance-assist-linkage mechanism 132, 232, 732, 1032 based on the information from the at least one inertial measurement unit or accelerometer. According to various embodiments, stiffness control of the balance-assist-linkage mechanism 132, 232, 732, 1032 may be based on the detection signal from the at least one inertial measurement unit or accelerometer. According to various embodiments, both the CoM position and CoM velocity determined from the at least one position sensor and the CoM acceleration from the at least one inertia measurement unit or accelerometer may be fused or combined together for detecting fall. According to various embodiments, fall detection may be based on the determined CoM position, the determined CoM velocity and the CoM acceleration.

Figure 13B:
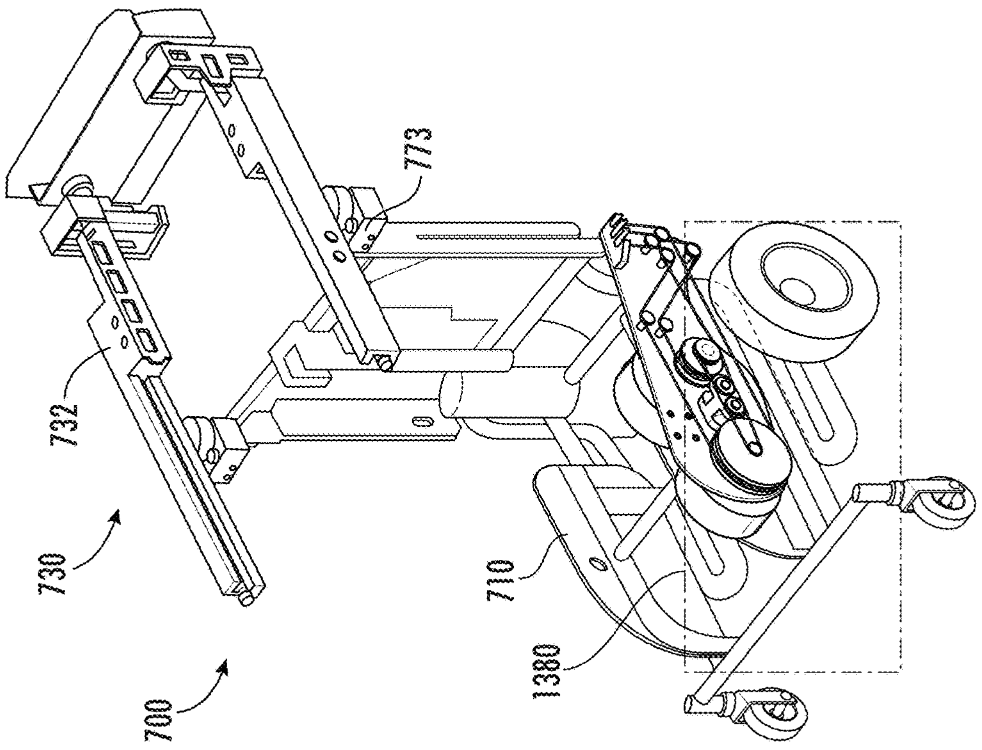
FIG. 13B shows an enlarged view of a Bowden cable of the variable braking system of FIG. 13A.
Figure 13A:
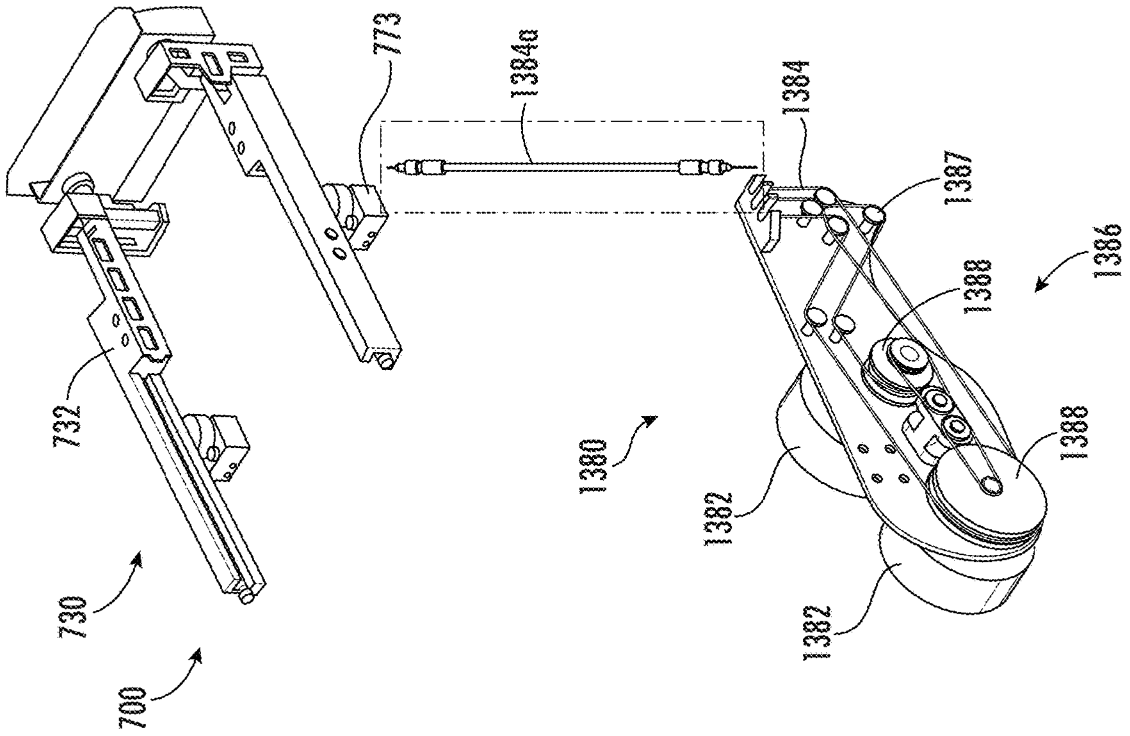
FIG. 13A and FIG. 13C show schematic diagrams of a variable braking system coupled to the balance-assist-linkage mechanism of the balance-assist unit of FIG. 7A and FIG. 7B to vary a stiffness of the balance-assist-linkage mechanism according to various embodiments.
Figure 13D:
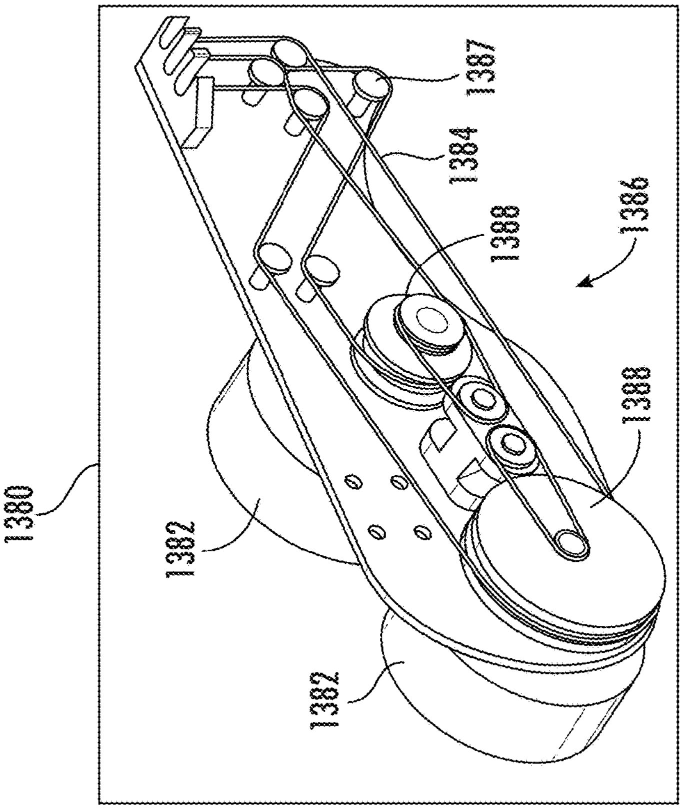
FIG. 13D shows an enlarged of a brake mechanism and a cable routing assembly of the variable braking system of FIG. 13A and FIG. 13B.
Figure 13C:
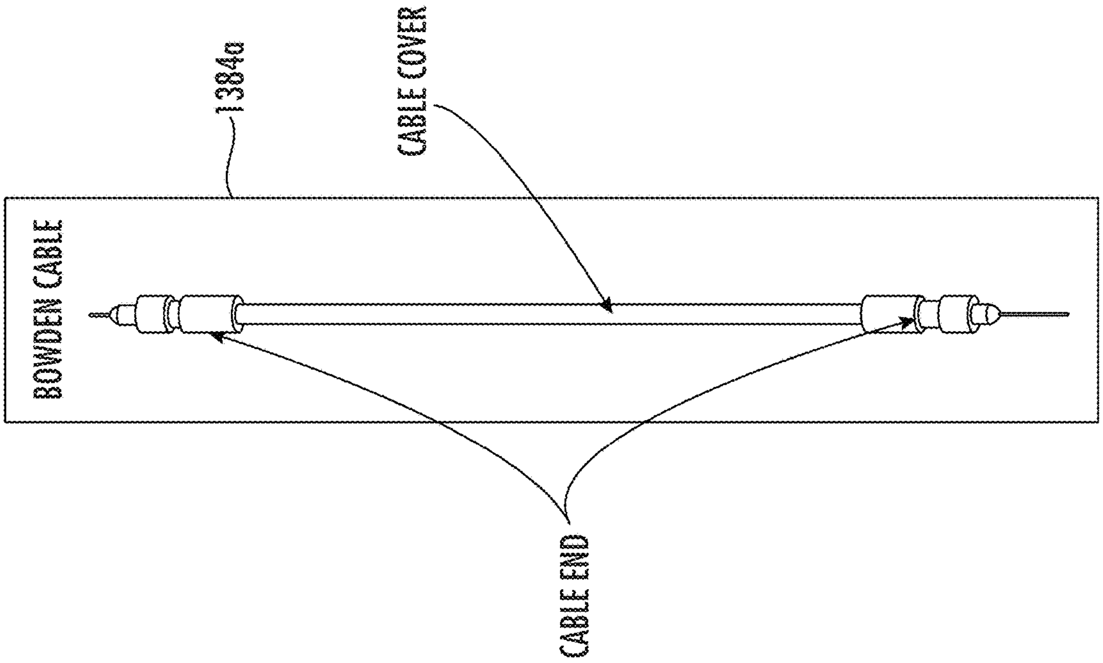

According to various embodiments, the mobility aid 100, 200, 300, 700 may include a variable braking system 1380. FIG. 13A and FIG. 13C show schematic diagrams of the variable braking system 1380 coupled to the balance-assist-linkage mechanism 732 of the balance-assist unit 730 of FIG. 7A and FIG. 7B to vary a stiffness of the balance-assist-linkage mechanism 732 according to various embodiments. FIG. 13B shows an enlarged view of a Bowden cable 1384*a* of the variable braking system 1380 of FIG. 13A. FIG. 13D shows an enlarged of a brake mechanism 1382 and a cable routing assembly 1386 of the variable braking system 1380 of FIG. 13A and FIG. 13B.

According to various embodiments, the variable braking system 1380 may be configured to stiffen instantaneously to catch a fall when required and become compliant or 'soft' when free space is needed to allow the user to move around. According to various embodiments, when the mobility aid 700 detects an impending fall of the user, the variable braking system 1380 may be controlled to stiffen the brake so as to stop the falling. According to various embodiments, different stiffness may be achieved by varying the control signal to provide different level of assistance.

According to various embodiments, the variable braking system 1380 may include the brake mechanism 1382 located at the mobile base 710 and a cable 1384 connecting the brake mechanism 1382 to one of the joints (e.g. the first revolute joint 773) of the balance-assist-linkage mechanism 732 to provide a resistive force from the brake mechanism to said joint for stiffness control of said joint. According to various embodiments, the brake mechanism 1382 may be configured to provide a brake force that is linearly proportionate to an input voltage. According to various embodiments, the brake mechanism 1382 may be configured to provide an instantaneous brake force when required. According to various embodiments, the brake mechanism 1382 may be controlled based on a brake-control signal. According to various embodiments, the brake-control signal may be generated based on the detection signal of the position sensors at the joints of the balance-assist-linkage mechanism 732 and/or based on the detection signal of inertial measurement unit or accelerometer. According to various embodiments, the variable braking system 1380 may include the cable routing assembly 1386 having a set of pulleys 1387 to guide the cable 1384 from the one of the joints of the balance-assist-linkage mechanism 732 to the brake mechanism 1382. According to various embodiments, the cable routing assembly 1386 may include a brake-pulley 1388 which may be directly connected to the brake mechanism 1382 and to which an end of the cable 1384 may be attached.

According to various embodiments, the brake mechanism 1382 may include a magnetic powder brake (or sometimes called a magnetic particle brake) to provide braking or actuation in the configuration as shown in FIG. 13A. According to various embodiments, magnetic powder brake may have a linear relationship between the input voltage and the brake force. According to various embodiments, the brake-control signal may be in the form of the input voltage. According to various embodiments, the variable braking system 1380 may be configured for fall prevention so as to provide balance assistance to the user. According to various embodiments, the main concept of fall prevention is to resist involuntary movement in unwanted direction to keep the CoM in the safe zone. According to various embodiments, by changing the stiffness of the brake mechanism 1382, the balance-assist-linkage mechanism 732 may be stiffened almost instantaneously to catch a fall when required and may become compliant or 'soft' when free space is needed to allow the user to move around.

According to various embodiments, the use of the cable 1384 and the cable routing assembly 1386 may allow placement of the magnetic powder brake (i.e. brake mechanism 1382) in mobile base 710 as shown in FIG. 13B. According to various embodiments, the cable 1384 may include a segment which is a Bowden cable 1384*a*. According to various embodiments, the Bowden cable 1384*a* may be used for routing from the balance-assist-linkage mechanism 732 to the mobile base 710. According to various embodiments, an exterior cover of the Bowden cable 1384*a* may be flexible and may adapt its shape accordingly when the mobility aid 700 is in the sitting disposition and the standing disposition. According to various embodiments, the use of cable 1384 for transmission of the braking force may help to keep the balance-assist-linkage mechanism 732 to a minimum weight which may improve the transparency or compliance of the balance-assist-linkage mechanism 732 for following the user. In addition, the use of cable 1384 may allow moving and placing of the brake mechanism 1382 to adjust the Center of Mass of the mobile base 710 so as to make the mobile base 710 more stable According to various embodiments, the cable routing system 1386 may be configured to guide the segment of the cable 1384 from the end of the Bowden cable to the brake mechanism 1382. According to various embodiments, there may be two kinds of pulley in the cable routing system 1386, one is the brake pulley 1388 which is directly connected to the brake mechanism 1382 and the other is the guide pulley 1387 which is used to guide the cable 1384 from the brake pulley 1388 to the end of the Bowden cable 1384*a* (or the Bowden end connector) as shown in FIG. 13A.

According to various embodiments, the variable braking system 1380 may include four brake mechanisms 1382 located at the mobile base 710 and four cables 1384 connecting the four brake mechanisms 1382 respectively to four joints (for example, revolute joints 773 and prismatic joints 774) of the balance-assist-linkage mechanism 732 of the balance-assist unit 730 of the mobility aid 700. According to various embodiments, the four brake mechanism 1382 may be connected to the joints 773, 774 of the balance-assist-linkage mechanism 732 using the cable 1384, which contains the Bowden cables 1384*a*, and the cable routing system 1386. Each of FIG. 13A and FIG. 13C shows only one side of the mobility aid 700 containing two brake mechanisms 1382 and the other side of the mobility aid 700 may just be a mirror image of the illustrated side of the mobility aid 700.

According to various embodiments, the mobility aid 100, 200, 300, 700 may include a processor. In various embodiments, a "processor" may be understood as any kind of a logic implementing entity, which may be special purpose circuitry or a processor executing software stored in a memory, firmware, or any combination thereof. Thus, in an embodiment, a "processor" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "processor" may also be a processor executing software, e.g. any kind of computer program, e.g. a computer program using a virtual machine code such as e.g. Java. Any other kind of implementation of the respective functions which will be described in more detail below may also be understood as a "processor" in accordance with various embodiments. In various embodiments, the processor may be part of a computing system or a controller or a microcontroller or any other system providing a processing capability. According to various embodiments, such systems may include a memory which is for example used in the processing carried out by the device or system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

According to various embodiments, the processor may be configured to generate the various control signals, such as the motor-control signal, the steering-control signal, the seat-actuation-control signal, the brake-control signal etc. for operating the mobility aid 100, 200, 300, 700. According to various embodiments, the processor may be configured to generate the various control signals so as to operate the mobility aid 100, 200, 300, 700 in the manner as described herein. According to various embodiments, the processor may be configured to receive the various input signals (e.g. movement-input signals, seat-actuation-input signal, etc.) from input interfaces and/or detection signals from sensors, process the various input signals and/or detection signals, and generate corresponding control signals in response for controlling various components of the mobility aid 100, 200, 300, 700. According to various embodiments, the processor may be configured to control the mobile base 110, 210, 310, 710 of the mobility aid 100, 200, 300, 700 for automatic following of the user based on detection signals from the sensor arrangement, in particular the position sensors at the joints of the balance-assist-linkage mechanism 132, 232, 732, 1032, when the seat is in the standing disposition. According to various embodiments, the processor may be configured to control a degree of stiffness of the balance-assist-linkage mechanism 132, 232, 732, 1032 based on detection signals from the sensor arrangement, in particular the inertial measurement unit or accelerometer, when the seat is in the standing disposition.

According to various embodiments, there is provided a mobile balance assistant (or a mobility aid), including:

- a wheelchaired mobile base (or a mobile base) configured of moving by power or by movement from a user;
- a chair (or a seat) rotatably (or pivotably) attached to the wheelchaired mobile base and configured of rotating (or pivoting) from a horizontal position to a vertical position relative to the wheelchaired mobile base;
- an extendable balance assistive mechanism (or a balance-assist-linkage mechanism) attached to the chair and configured of being extendable at least along a front-to-back direction by a forward or backward force from the user; and
- a control mechanism configured of being operable by a user.

According to various embodiments, the extendable balance assistive mechanism may be rotatably attached to an end of the chair.

According to various embodiments, the extendable balance assistive mechanism may be configured of assisting the user to be located beyond the remote end of the mobile balance assistant. According to various embodiments, the remote end of the mobile balance assistant may be a front end of the wheelchaired mobile base or a front end of a handrail, and wherein the handrail may be located beside the extendable balance assistive mechanism.

According to various embodiments, the mobile balance assistant (or the mobility aid) may further include a user coupler (or a body-support member) attached to the extendable balance assistive mechanism and configured to be coupled to the body of the user. According to various embodiments, the user coupler may be configured to be coupled to the back, waist or pelvis of the user. According to various embodiments, the user coupler may be configured of being movable along an up-to-down direction and/or rotatable and/or bending relative to the extendable balance assistive mechanism. According to various embodiments, the mobile balance assistant (or the mobility aid) may further include a pair of rotary joints and a pair of linear joints between the user coupler and the extendable balance assistive mechanism to realize the up-to-down movement and/or rotation and/or bending therebetween. According to various embodiments, the mobile balance assistant (or the mobility aid) may further include a belt (or a securing component) coupled to the user coupler to form a space for accommodating the body of the user.

According to various embodiments, the extendable balance assistive mechanism may include a pair of guide rails respectively rotatably attached to lateral ends of the chair and a pair of slide arms respectively slidably attached to the guide rails and configured of sliding along the guide rails to lengthen or shorten the extendable balance assistive mechanism. According to various embodiments, the mobile balance assistant (or the mobility aid) may further include a pair of first linear joints arranged between the guide rails and the slide arms to realize the forward or backward movement therebetween. According to various embodiments, the mobile balance assistant (or the mobility aid) may further include a pair of first rotary joints arranged between the guide rails and the lateral ends of the chair to realize the rotation movement therebetween. According to various embodiments, the mobile balance assistant (or the mobility aid) may further include a user coupler attached to the extendable balance assistive mechanism and configured to be coupled to the pelvis of the user, and may further include a pair of second rotary joints and a pair of second linear joints between the user coupler and the extendable balance assistive mechanism to realize the up-to-down movement and/or rotation and/or bending therebetween.

According to various embodiments, the mobile balance assistant (or the mobility aid) may further include a variable stiffness system (or a variable braking system) including brakes configured of indirectly connected with the first rotary joints and/or the first linear joints and/or the second rotary joints and/or the second linear joints. According to various embodiments, the mobile balance assistant (or the mobility aid) may further include sets of pulleys and Bowden cables connecting the brakes with the first rotary joints and/or the first linear joints and/or the second rotary joints and/or the second linear joints. According to various embodiments, the mobile balance assistant (or the mobility aid) may further include a pair of mounting boards between the wheels and the brakes. According to various embodiments, the pulleys and the brakes may be attached to the mounting boards, and the Bowden cables may be wrapped from the rotary joints and/or the linear joints to the pulleys for actuating the brakes to pause the wheels. According to various embodiments, the brakes may be magnetic powder brakes. According to various embodiments, the mobile balance assistant (or the mobility aid) may further include four brakes corresponding to four wheels of the wheelchaired mobile base for pausing the wheels.

According to various embodiments, the terms of the brakes pausing the wheels of the wheelchaired mobile base may be based on the movement range of the back, waist or the pelvis of the user.

According to various embodiments, the terms of the brakes pausing the wheels of the wheelchaired mobile base may be:

1) back or waist or pelvis of the user along forward/backward direction out of the range: −200 mm to +200 mm; and/or
2) back or waist or pelvis of the user along lateral direction out of the range: −150 mm to +150 mm; and/or
3) back or waist or pelvis of the user along upward/downward direction out of the range: −50 mm to +50 mm; and/or
4) rotation angle of back or waist or pelvis of the user out of the range: −60° to +60°; and/or
5) bending and of back or waist or pelvis of the user out of the range: −20° to +20°; and/or
6) hike angle of back or waist or pelvis of the user out of the range: −20° to +20°.

According to various embodiments, the extendable balance assistive mechanism may include a plurality of connecting rods and a plurality of revolute joints rotatably attached between adjacent connecting rods. According to various embodiments, the extendable balance assistive mechanism may be configured to rotatably attach to the user coupler and the chair.

According to various embodiments, the mobile balance assistant (or the mobility aid) may further include potentiometers or encoders (or suitable sensors) to measure the movements of the extendable balance assistance mechanism. According to various embodiments, the mobile balance assistant (or the mobility aid) may further include a user coupler configured to be coupled to the user and rotary joints and/or linear joints arranged between the extendable balance assistance mechanism and the user coupler and/or the chair. According to various embodiments, the potentiometers or encoders may be attached at the rotary joints and/or linear joints.

According to various embodiments, the chair may be equipped with a linear actuator which is configured of being actuated by the control mechanism to actuate the chair from the horizontal position to the vertical position.

According to various embodiments, the chair may be attached with four rotary joints to respectively rotatably coupled with the wheelchaired mobile base and the extendable balance assistive mechanism.

According to various embodiments, there is provided a method of providing a mobile balance assistant (or a mobility aid). The method including:

providing a wheelchaired mobile base (or a mobile base), configured of moving by power or by movement from a user;

providing a chair (or a seat) rotatably (or pivotably) attached to the wheelchaired mobile base and configured of rotating from a horizontal position to a vertical position relative to the wheelchaired mobile base;

providing an extendable balance assistive mechanism (or a balance-assist-linkage mechanism) attached to the chair and configured of being extendable at least along a front-to-back direction by a forward or backward force from the user; and providing a control mechanism configured of being operable by a user.

Various embodiments have provided a mobility aid which can be used by wheelchair users, elderly people with walking disability, stroke patients and people with high chance of falling during walking in a home based environment for rehabilitation purposes or for daily activity assistance. According to various embodiments, the mobility aid may allow home-based rehabilitation and may introduce new rehabilitation method which may be more effective than traditional therapies conducted in hospitals and institutions.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A mobility aid comprising:

a mobile base movable along a mobile-base-movement plane, the mobile base having a plurality of wheels;

a seat pivotably coupled to the mobile base in a manner so as to be pivotable between a sitting disposition, in which the seat is oriented parallel to the mobile-base-movement plane, and a standing disposition, in which the seat is oriented perpendicular to the mobile-base-movement plane and a main sitting surface of the seat is facing forward with respect to a forward-movement direction of the mobile base; and a balance-assist unit having a balance-assist-linkage mechanism coupled to the seat, and a body-support-module coupled to the balance-assist-linkage mechanism, wherein components of the balance-assist-linkage mechanism are jointed in a manner movable to allow movements of the body-support-module relative to the seat along a module-movement-plane parallel to the mobile-base-movement plane when the seat is in the standing disposition.

2. The mobility aid as claimed in claim 1, further comprising a parallelogram linkage mechanism connecting the mobile base, the seat and the balance-assist unit, the parallelogram linkage mechanism having a pair of equal parallel links being parallel to the seat, wherein the seat is attached to one of the pair of equal parallel links, wherein first and second pin joints of the parallelogram linkage mechanism, which are respectively at first longitudinal ends of the pair of equal parallel links, couple the seat to the mobile base and third and fourth pin joints of the parallelogram linkage mechanism, which are respectively at second longitudinal ends of the pair of equal parallel links, couple the seat to the balance-assist unit in a manner such that an orientation of the balance-assist-linkage mechanism of the balance-assist unit with respect to the mobile base is unchanged when the seat is pivoted about the first and second pin joints simultaneously to move the seat between the sitting disposition and the standing disposition with respect to the mobile base.

3. The mobility aid as claimed in claim 1, further comprising a seat-actuator disposed between the seat and the mobile base so as to actuate the seat between the sitting disposition and the standing disposition.

4. The mobility aid as claimed in claim 1, wherein the balance-assist-linkage mechanism is configured to provide the body-support-module with a three degree-of-freedom relative to the seat along the module-movement-plane, the three degree-of-freedom includes forward and backward movements which are parallel to the forward-movement direction of the mobile base, lateral movements which are perpendicular to the forward and backward movements, and yaw movements about a support-module-rotational axis which is perpendicular to the module-movement-plane.

5. The mobility aid as claimed in claim 1, wherein the balance-assist-linkage mechanism comprises a pair of arm assemblies, each arm assembly comprising a first link member and a second link member, wherein the first link member is rotatable about a first revolute joint having a first rotational axis perpendicular to the module-movement-plane, the first revolute joint connecting the first link member to the seat, wherein the second link member is in sliding engagement with the first link member via a prismatic joint having a sliding axis along or parallel to the module-movement-plane, wherein the body-support-module is connected to the second link member via a second revolute joint having a second rotational axis perpendicular to the module-movement-plane.

6. The mobility aid as claimed in claim 1, wherein the balance-assist-linkage mechanism comprises a pair of arm assemblies, each arm assembly comprising a first link member and a second link member, wherein the first link member is rotatable about a first revolute joint having a first rotational axis perpendicular to the module-movement-plane, the first revolute joint connecting the first link member to the seat, wherein the second link member is connected and rotatable relative to the first link member via a second revolute joint having a second rotational axis perpendicular to the module-movement-plane, and wherein the body-support-module is connected to the second link member via a third revolute joint having a third rotational axis perpendicular to the module-movement-plane.

7. The mobility aid as claimed in claim 1, wherein the body-support-module comprises a connection structure which couples the body-support-module to the balance-assist-linkage mechanism;

a body-support-member; and a support-member-movement mechanism which couples the body-support-member to the connection structure, wherein the support-member-movement mechanism is configured to provide the body-support-member with three degree-of-freedom relative to the connection structure, the three degree-of-freedom including upward and downward movements perpendicular to the module-movement-plane, roll movements about a roll axis extending perpendicularly from a body contact surface of the body-support-member, and pitch movements about a pitch axis perpendicular to both the roll axis and upward and downward movements.

8. The mobility aid as claimed in claim 1, further comprising a variable braking system coupled to the balance-assist-linkage mechanism of the balance-assist unit to vary a stiffness of the balance-assist-linkage mechanism.

9. The mobility aid as claimed in claim 8, wherein the variable braking system comprises a brake mechanism located at the mobile base and a cable connecting the brake mechanism to a joint of the balance-assist-linkage mechanism to provide a resistive force from the brake mechanism to said joint for stiffness control of said joint.

10. The mobility aid as claimed in claim 8, wherein the variable braking system comprises a cable routing assembly having a set of pulleys to guide the cable from the joint of the balance-assist-linkage mechanism to the brake mechanism.

11. The mobility aid as claimed in claim 10, wherein the cable routing assembly comprises a brake-pulley which is directly connected to the brake mechanism and to which an end of the cable is attached.

12. The mobility aid as claimed in claim 9, wherein the variable braking system comprises four brake mechanisms located at the mobile base and four cables connecting the four brake mechanisms respectively to four joints of the balance-assist-linkage mechanism.

13. The mobility aid as claimed in claim 9, wherein the brake mechanism comprises a magnetic powder brake.

14. The mobility aid as claimed in claim 1, further comprising a shank support mechanism at a front portion of the mobile base with respect to the forward-movement direction of the mobile base, the shank support mechanism comprises a pair of shank support plates, and a movement mechanism configured to move the pair of shank support plates between an open position and a closed position, wherein, in the open position, the pair of shank support plates is moved apart from each other such that a space in front of the front portion of the mobile base is unobstructed by the pair of shank support plates, and wherein, in the closed position, the pair of shank support plates is moved towards each other such that the pair of shank support plates is positioned in front of the front portion of the mobile base.

15. The mobility aid as claimed in claim 1, wherein the body-support-module comprises a securing component for connecting a user to the balance-assist unit.

16. The mobility aid as claimed in claim 15, wherein the securing component comprises a quick attachment and release buckle.

17. The mobility aid as claimed in claim 1, wherein the balance-assist unit further comprises a sensor arrangement configured to detect movements of the balance-assist unit.

18. The mobility aid as claimed in claim 17, wherein the sensor arrangement comprises at least one position sensor attached to the balance-assist-linkage mechanism.

19. The mobility aid as claimed in claim 17, wherein the sensor arrangement comprises at least one inertial measurement unit or accelerometer attached to the body-support-module.

20. The mobility aid as claimed in claim 17, further comprising a processor configured to control the mobile base for automatic following based on detection signals from the sensor arrangement when the seat is in a vertical disposition, and further configured to control a degree of stiffness of the balance-assist-linkage mechanism of the balance-assist unit based on detection signals from the sensor arrangement when the seat is in the standing disposition.

* * * * *